US011194205B2

(12) United States Patent
Lee et al.

(10) Patent No.: US 11,194,205 B2
(45) Date of Patent: Dec. 7, 2021

(54) PIXEL ARRAY SUBSTRATE

(71) Applicant: Au Optronics Corporation, Hsinchu (TW)

(72) Inventors: Min-Tse Lee, Hsinchu (TW); Sheng-Yen Cheng, Hsinchu (TW); Yueh-Hung Chung, Hsinchu (TW); Kuang-Hsiang Liao, Hsinchu (TW); Yang-Chun Lee, Hsinchu (TW); Yan-Kai Wang, Hsinchu (TW); Ya-Ling Hsu, Hsinchu (TW); Yi-Ren Chen, Hsinchu (TW); Hung-Che Lin, Hsinchu (TW); Sheng-Ju Ho, Hsinchu (TW); Chien-Huang Liao, Hsinchu (TW); Chen-Hsien Liao, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/083,305

(22) Filed: Oct. 29, 2020

(65) Prior Publication Data

US 2021/0041755 A1 Feb. 11, 2021

Related U.S. Application Data

(63) Continuation of application No. 16/792,904, filed on Feb. 18, 2020, now Pat. No. 10,852,609.

(60) Provisional application No. 62/811,012, filed on Feb. 27, 2019.

(30) Foreign Application Priority Data

Oct. 28, 2019 (TW) .................................. 108138907

(51) Int. Cl.
*G02F 1/1362* (2006.01)

(52) U.S. Cl.
CPC .. *G02F 1/136286* (2013.01); *G02F 1/136227* (2013.01); *G02F 1/136218* (2021.01); *G02F 2201/121* (2013.01); *G02F 2201/123* (2013.01)

(58) Field of Classification Search
None
See application file for complete search history.

(56) References Cited

U.S. PATENT DOCUMENTS

2018/0196322 A1* 7/2018 Yamazaki ......... G02F 1/136213

* cited by examiner

*Primary Examiner* — Phu Vu
(74) *Attorney, Agent, or Firm* — JCIPRNET

(57) ABSTRACT

A pixel array substrate including a substrate, data lines, gate lines, pixels, and transfer lines is provided. The data lines are disposed on the substrate and arranged in a first direction. The gate lines are disposed on the substrate and arranged in a second direction interlaced with the first direction. The pixels are disposed on the substrate, each of which includes an active device electrically connected to one of the data lines and one of the gate lines and a pixel electrode electrically connected to the active device. The transfer lines are arranged in the first direction and electrically connected to the gate lines, respectively. The pixels include first pixels. In a top view of the pixel array substrate, at least one of the pixel electrodes of the first pixels is partially overlapped with one of the transfer lines. A driving method of a pixel array substrate is also provided.

20 Claims, 20 Drawing Sheets

PIXEL ARRAY SUBSTRATE

CROSS-REFERENCE TO RELATED APPLICATION

This application is a continuation application of and claims the priority benefit of U.S. application Ser. No. 16/792,904, filed on Feb. 18, 2020, now allowed. The prior U.S. application Ser. No. 16/792,904 claims the domestic benefit of U.S. provisional application Ser. No. 62/811,012, filed on Feb. 27, 2019 and the priority benefit of Taiwan patent application serial no. 108138907, filed on Oct. 28, 2019. The entirety of each of the above-mentioned patent applications is hereby incorporated by reference herein and made a part of this specification.

BACKGROUND

Technical Field

The disclosure relates to a pixel array substrate and a driving method thereof.

Description of Related Art

With the development of display technologies, the demand for display devices is no longer limited to favorable optical characteristics, such as high resolution, high contrast, and wide viewing angles. People also expect the display devices to have elegant appearance. For instance, people expect the display devices to have narrow frames or even to be frameless.

Generally speaking, the display device includes a pixel array disposed in a display region, a data driving circuit disposed below the display region, and a gate driving circuit disposed on the left side, the right side, or both the left and the right sides of the display region. In order to reduce the width of the left and right sides of the frame of the display device, both the gate driving circuit and the data driving circuit may be disposed on the lower side of the display region. When the gate driving circuit is disposed on the lower side of the display region, a gate line extending in a horizontal direction can merely be electrically connected to the gate driving circuit through a transfer line extending in a vertical direction. The transfer line, however, occupies the layout area of the display region, and the number of circuits in the display region also increases, thus affecting an aperture ratio of a pixel array substrate of the display device and the manufacturing yield.

SUMMARY

The disclosure provides a pixel array substrate with favorable characteristics.

The disclosure provides another pixel array substrate with favorable characteristics.

According to an embodiment of the disclosure, a pixel array substrate a substrate, a plurality of data lines, a plurality of gate lines, a plurality of pixels, and a plurality of transfer lines. The data lines are disposed on the substrate and arranged in a first direction. The gate lines are disposed on the substrate and arranged in a second direction. The first direction is interlaced with the second direction. The pixels are disposed on the substrate. Each of the pixels includes an active device and a pixel electrode, the active device is electrically connected to one of the data lines and one of the gate lines, and the pixel electrode is electrically connected to the active device. The transfer lines are arranged in the first direction and electrically connected to the gate lines, respectively. The pixels include a plurality of first pixels. In a top view of the pixel array substrate, at least one of the pixel electrodes of the first pixels is partially overlapped with one of the transfer lines.

In an embodiment of the disclosure, the pixels further include a plurality of second pixels, and at least one of the second pixels further includes a common electrode. In the top view of the pixel array substrate, the pixel electrode and the common electrode of the at least one of the second pixels are partially overlapped, the common electrode of the at least one of the second pixels and the one of the transfer lines are overlapped, and a gap exists between the pixel electrode of the at least one of the second pixels and the one of the transfer lines.

In an embodiment of the disclosure, each of the transfer lines has a first portion and a second portion connected to each other. In the top view of the pixel array substrate, the first portion of each of the transfer lines and the at least one of the pixel electrodes of the first pixels are partially overlapped, a gap exists between the second portion of each of the transfer lines and the pixel electrode of the at least one of the second pixels, and a line width of the first portion of each of the transfer lines is greater than a line width of the second portion of each of the transfer lines.

In an embodiment of the disclosure, each of the transfer lines has a second portion. In the top view of the pixel array substrate, the gap exists between the second portion of each of the transfer lines and the pixel electrode of the at least one of the second pixels, and a line width of the second portion of each of the transfer lines is smaller than a line width of the common electrode of the at least one of the second pixels.

In an embodiment of the disclosure, the pixels further include a plurality of second pixels. Each of the second pixels includes a common electrode. In the top view of the pixel array substrate, the pixel electrode and the common electrode of each of the second pixels are partially overlapped, the common electrode of each of the second pixels is overlapped with a corresponding transfer line of the transfer lines, and a gap exists between the pixel electrode of each of the second pixels and the corresponding transfer line. The pixels include a plurality of pixel groups. At least one of the pixel groups includes n second pixels and one of the first pixels sequentially arranged along the corresponding transfer line. The pixel array substrate further includes an insulation layer sandwiched between the gate lines and the transfer lines. The insulation layer has a plurality of first through holes. The n second pixels of the at least one of the pixel groups include a first second pixel to an $n^{th}$ second pixel arranged in sequence, the active device of the first second pixel is electrically connected to one of the gate lines, and each of the transfer lines is electrically connected to the one of the gate lines through one of the first through holes of the insulation layer, wherein n is a positive integer greater than or equal to 2.

In an embodiment of the disclosure, each of the pixel groups includes n second pixels and one of the first pixels sequentially arranged along the corresponding transfer line, the n second pixels of each of the pixel groups include the first second pixel to the $n^{th}$ second pixel sequentially arranged; the active device of the first second pixel is electrically connected to one of the gate lines, each of the transfer lines is electrically connected to the one of the gate lines through one of the first through holes of the insulation layer, the one of the first pixels of each of the pixel groups is a pixel in the each of the pixel groups closest to the second pixels of the each of the pixel groups, and the first pixels of the pixel groups are arranged substantially in a staircase shape.

In an embodiment of the disclosure, the pixel array substrate further includes an insulation layer. The insulation layer has a plurality of second through holes. Each of the transfer lines includes a main portion and at least one auxiliary portion, the insulation layer is sandwiched between the main portion and the at least one auxiliary portion, the main portion crosses over the gate lines, the at least one auxiliary portion is disposed between two adjacent gate lines of the gate lines and partially overlapped with the at least one of the pixel electrodes of the first pixels, and two different regions of the main portion are electrically connected to two ends of the at least one auxiliary portion through the second through holes of the insulation layer.

According to an embodiment of the disclosure, a driving method of a pixel array substrate is adapted for driving the above-mentioned pixel array substrate and includes following steps. In a first time interval, one of the gate lines electrically connected to the first second pixel of the at least one of the pixel groups is enabled to have a gate-on potential; in a second time interval, another one of the gate lines electrically connected to the first pixel of the at least one of the pixel groups is enabled to have the gate-on potential, wherein the first time interval and the second time interval are not overlapped in time sequence.

According to an embodiment of the disclosure, another driving method of a pixel array substrate disclosure is adapted for driving the above-mentioned pixel array substrate. The gate lines of the pixel array substrate are categorized into a plurality of gate line groups, and each of the gate line groups includes m gate lines, wherein m is a positive integer greater than or equal to 1, and the driving method includes following steps. The m gate lines of the same gate line groups are simultaneously turned on, wherein when each of the gate line groups is turned on, each of the m gate lines of the each of the gate line groups has a gate-on pulse. The gate line groups are sequentially turned on with a time delay, wherein a time length of the time delay is t, the time length of the gate-on pulse is T, and $n \geq \{[(T-t)/t]*m\}+m$.

According to an embodiment of the disclosure, another pixel array substrate includes a substrate, a plurality of data lines, a plurality of gate lines, a plurality of pixels, a plurality of transfer lines, and a shielding electrode. The data lines are disposed on the substrate and arranged in a first direction. The gate lines are disposed on the substrate and arranged in a second direction, wherein the first direction and the second direction are interlaced with each other. The pixels are disposed on the substrate. Each of the pixels includes an active device and a pixel electrode, wherein the active device is electrically connected to a corresponding data line of the data lines and a corresponding gate line of the gate lines, and the pixel electrode is electrically connected to the active device. The transfer lines are arranged in the first direction and electrically connected to the gate lines, respectively. In a top view of the pixel array substrate, a gap exists between the pixel electrode of at least one of the pixels and one of the transfer lines, the shielding electrode is separated from the pixel electrode of the at least one of the pixels, and the shielding electrode is overlapped with the one of the transfer lines.

According to an embodiment of the disclosure, a pixel array substrate includes a substrate, a plurality of data lines, a plurality of gate lines, and a plurality of pixels. The data lines are disposed on the substrate and arranged in a first direction. The gate lines are disposed on the substrate and arranged in a second direction, wherein the first direction is interlaced with the second direction. The pixels are disposed on the substrate, and each of the pixels includes an active device, a pixel electrode, and a portion of a transfer line. The active device is electrically connected to a corresponding data line of the data lines and a corresponding gate line of the gate lines, the pixel electrode is electrically connected to the active device, and the portion of the transfer line is arranged corresponding to the pixel electrode. The pixels include a first pixel, a second pixel, and a third pixel arranged in the second direction. The first pixel, the second pixel, and the third pixel include a plurality of portions of the transfer line and are structurally different from one another.

In an embodiment of the disclosure, in the top view of the pixel array substrate, the pixel electrode of the first pixel and the portion of the transfer line of the first pixel are partially overlapped.

In an embodiment of the disclosure, the second pixel further includes a common electrode. In the above-mentioned top view of the pixel array substrate, in the top view of the pixel array substrate, the pixel electrode and the common electrode of the second pixel are partially overlapped, the common electrode and the portion of the transfer line of the second pixel are overlapped, a gap exists between the pixel electrode and the transfer line of the second pixel, and the transfer line of the second pixel crosses over one of the gate lines electrically connected to the active device of the second pixel.

In an embodiment of the disclosure, the second pixel further includes a common electrode. In the top view of the pixel array substrate, the pixel electrode and the common electrode of the second pixel are partially overlapped, the common electrode and the portion of the transfer line of the second pixel are overlapped, a gap exists between the pixel electrode and the transfer line of the second pixel, and the portion of the transfer line of the second pixel is electrically connected one of the gate lines electrically connected to the active device of the second pixel.

In an embodiment of the disclosure, in the top view of the pixel array substrate, a line width of the portion of the transfer line of the first pixel is greater than a line width of the portion of the transfer line of the second pixel.

In an embodiment of the disclosure, in the top view of the pixel array substrate, the line width of the portion of the transfer line of the second pixel is smaller than a line width of the common electrode of the second pixel.

In order to make the aforementioned features and advantages of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
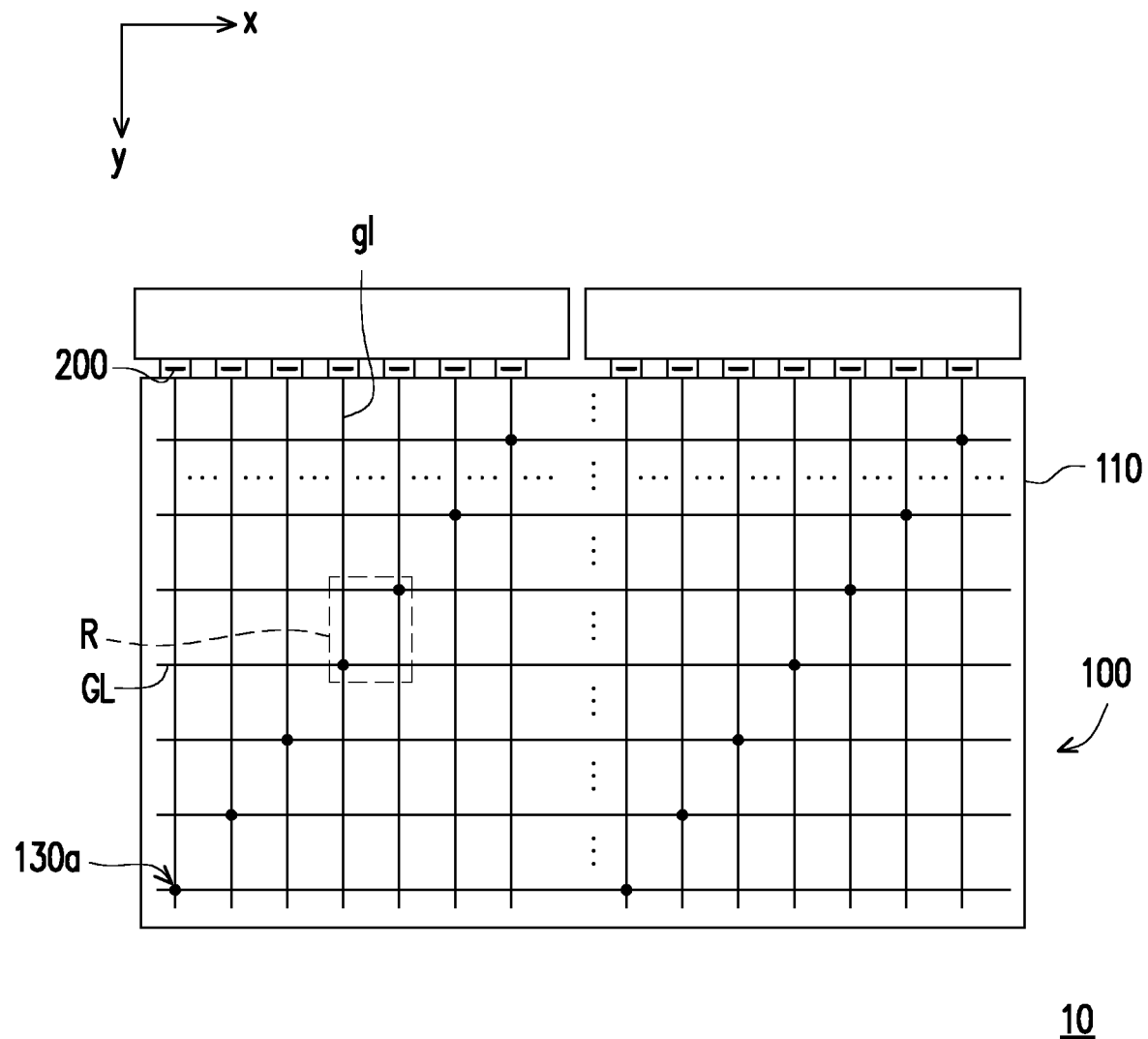
FIG. 1 is a schematic top view of a display device 10 according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

In the accompanying drawings, the thicknesses of layers, films, panels, regions, and the like are enlarged for clarity. Throughout the specification, same reference numerals indicate same components. It should be understood that when a component such as a layer, film, region or substrate is referred to as being "on" or "connected" to another component, it may be directly on or connected to the another component, or intervening components may also be present. In contrast, when a component is referred to as being "directly on" or "directly connected to" another component, there are no intervening assemblies present. As used herein, "connection" may refer to a physical and/or electrical connection. In addition, an "electrical connection" or "coupling" may be the another component between two components.

As used herein, "about", "approximately", or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For instance, "about" can mean within one or more standard deviations, or within ±30%, ±20%, ±10%, ±5% of the stated value. Further, as used herein, "about", "approximately", or "substantially" may depend on optical properties, etch properties, or other properties to select a more acceptable range of deviations or standard deviations without one standard deviation for all properties.

Unless otherwise defined, all terms (including technical and scientific terms) used herein have the same meaning as commonly understood by one of ordinary skill in the art to which the disclosure belongs. It will be further understood that terms such as those defined in commonly used dictionaries should be interpreted as having a meaning that is consistent with their meaning in the context of the relevant art and the disclosure and will not be interpreted in an idealized or overly formal sense unless expressly so defined herein.

FIG. 1 is a schematic top view of a display device 10 according to an embodiment of the disclosure. In FIG. 1, a pixel array substrate 100 and a driver device 200 are illustrated, while the other components of the display device 10 are omitted.

Figure 2:
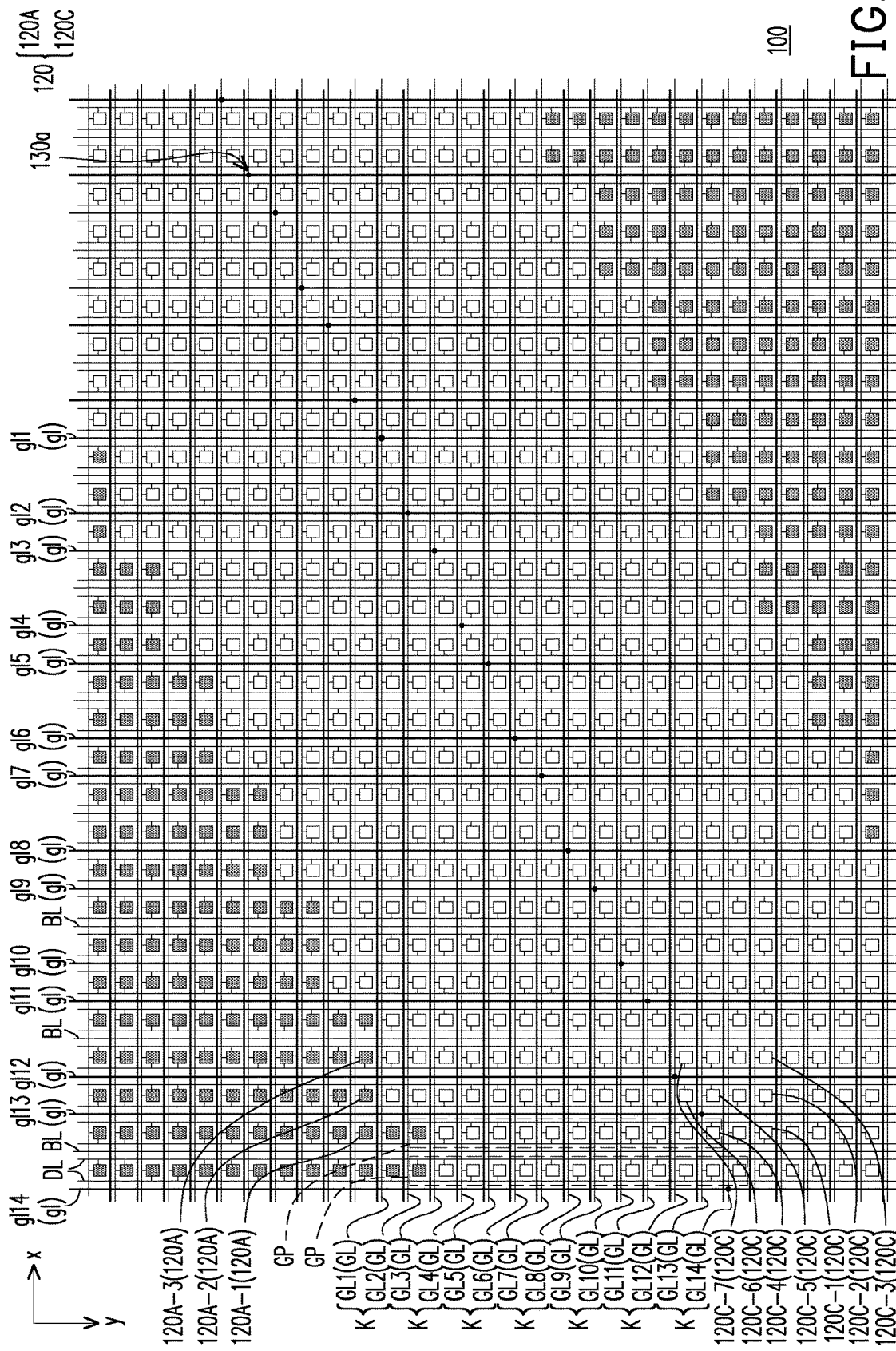
FIG. 2 is a schematic top view of a pixel array substrate 100 according to an embodiment of the disclosure.

FIG. 2 is a schematic top view of the pixel array substrate 100 according to an embodiment of the disclosure and corresponds to a partial region R shown in FIG. 1. A plurality of pixels 120, a plurality of data lines DL, and a plurality of bridge devices BL shown in FIG. 2 are omitted in FIG. 1.

Note that FIG. 2 schematically illustrates the pixel array substrate 100 and does not depict the actual layout of the pixel array substrate 100; the actual layout of various pixels 120 of the pixel array substrate 100 is respectively shown in FIG. 3, FIG. 5-FIG. 7, and FIG. 9-FIG. 15.

Figure 3:
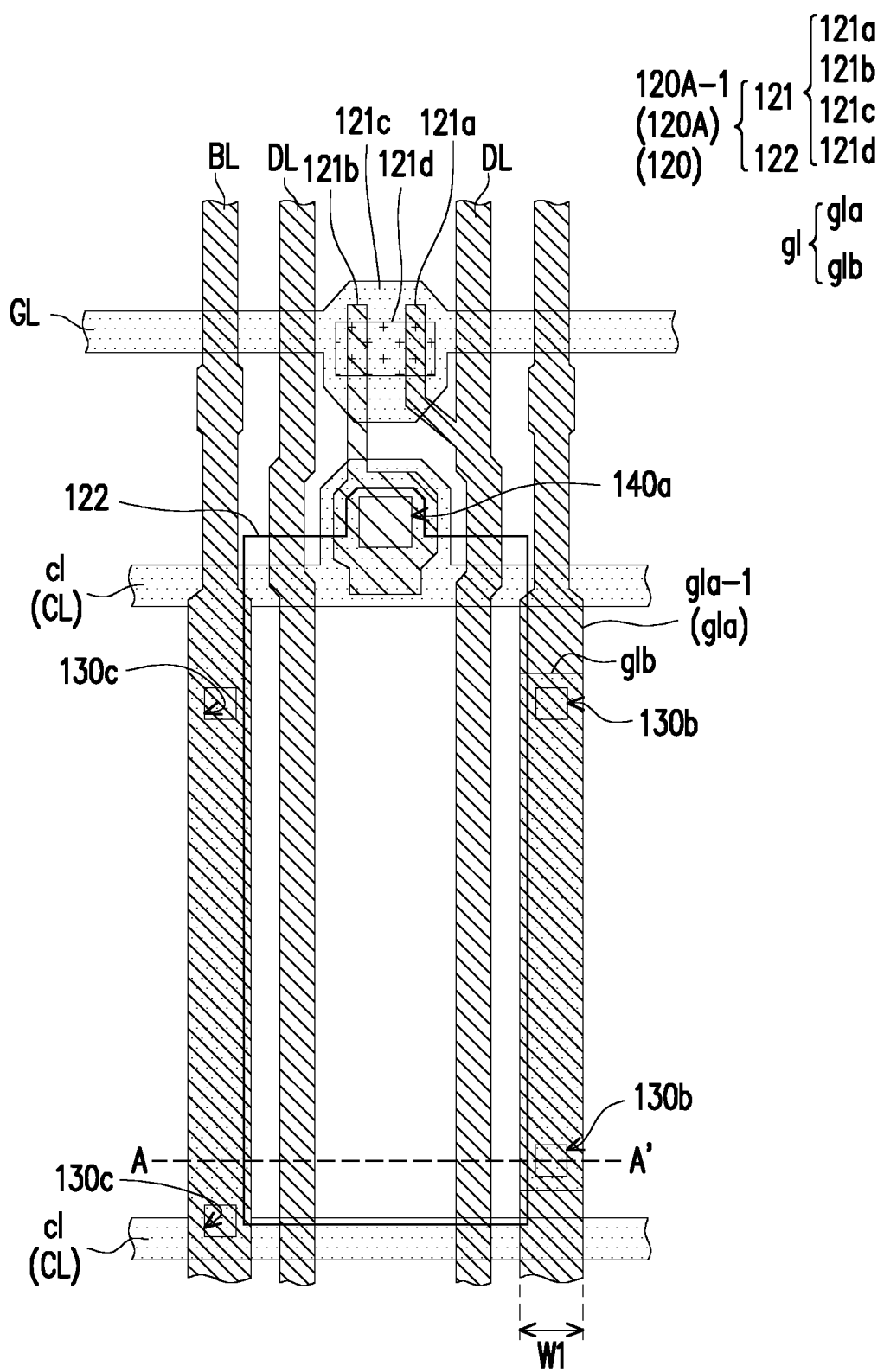
FIG. 3 is a schematic enlarged view of a pixel 120A-1 of the pixel array substrate 100 according to an embodiment of the disclosure.

FIG. 3 is a schematic enlarged view of a pixel 120A-1 of the pixel array substrate 100 according to an embodiment of the disclosure.

Figure 4:
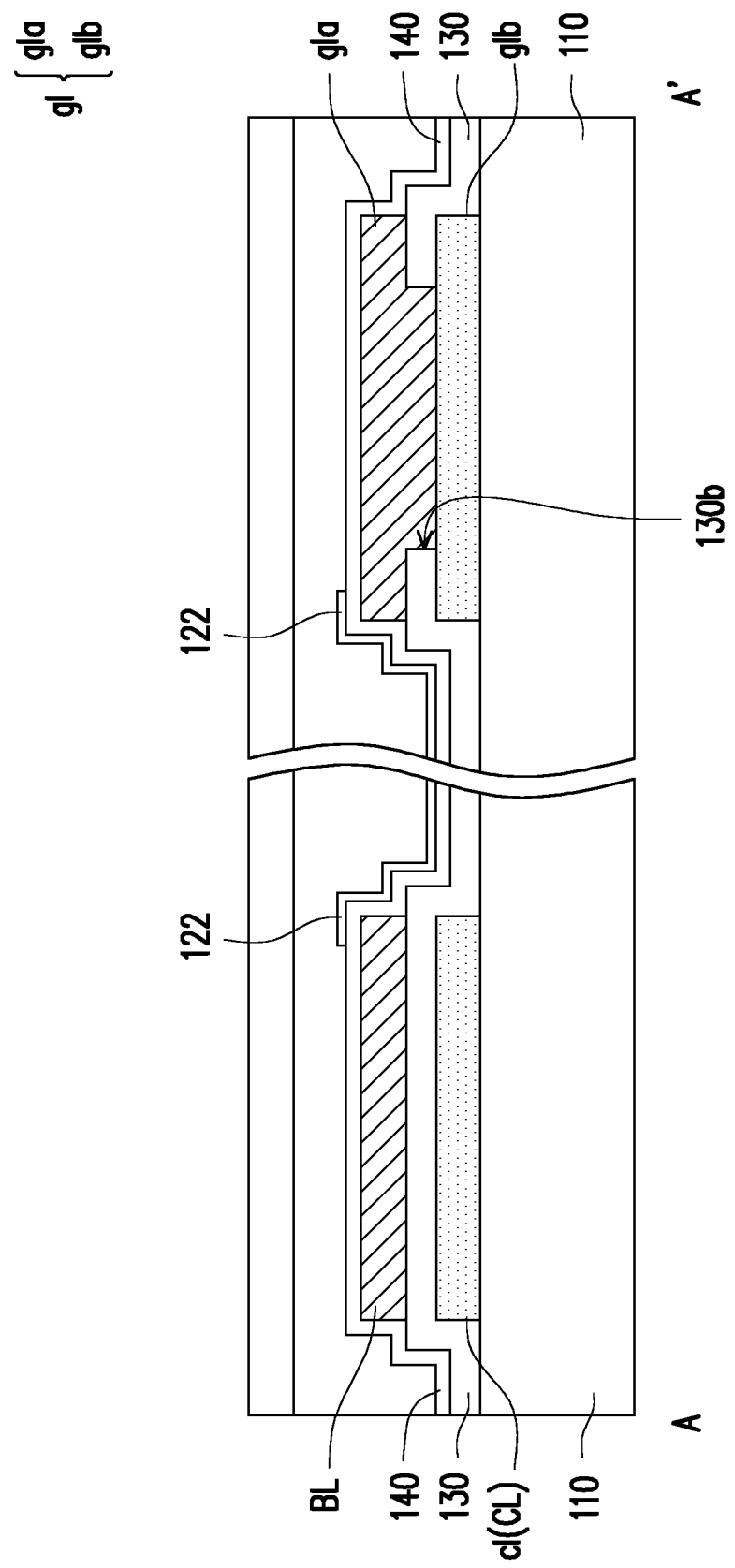
FIG. 4 is a schematic cross-sectional view of the pixel array substrate 100 according to an embodiment of the disclosure.

FIG. 4 is a schematic cross-sectional view of the pixel array substrate 100 according to an embodiment of the disclosure and corresponds to a sectional line A-A' shown in FIG. 3.

Figure 5:
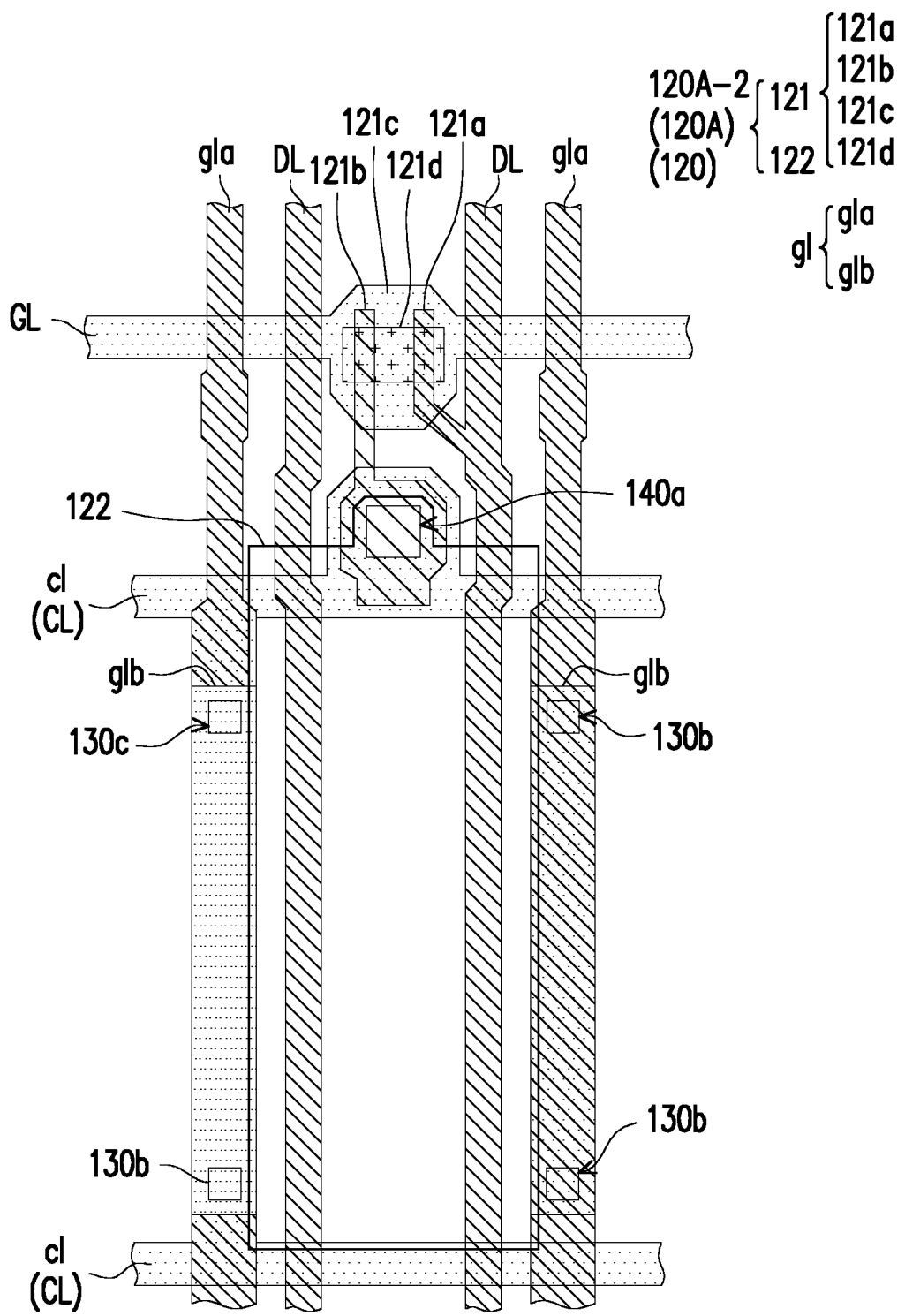
FIG. 5 is a schematic enlarged view of a pixel 120A-2 of the pixel array substrate 100 according to an embodiment of the disclosure.

FIG. 5 is a schematic enlarged view of a pixel 120A-2 of the pixel array substrate 100 according to an embodiment of the disclosure.

Figure 6:
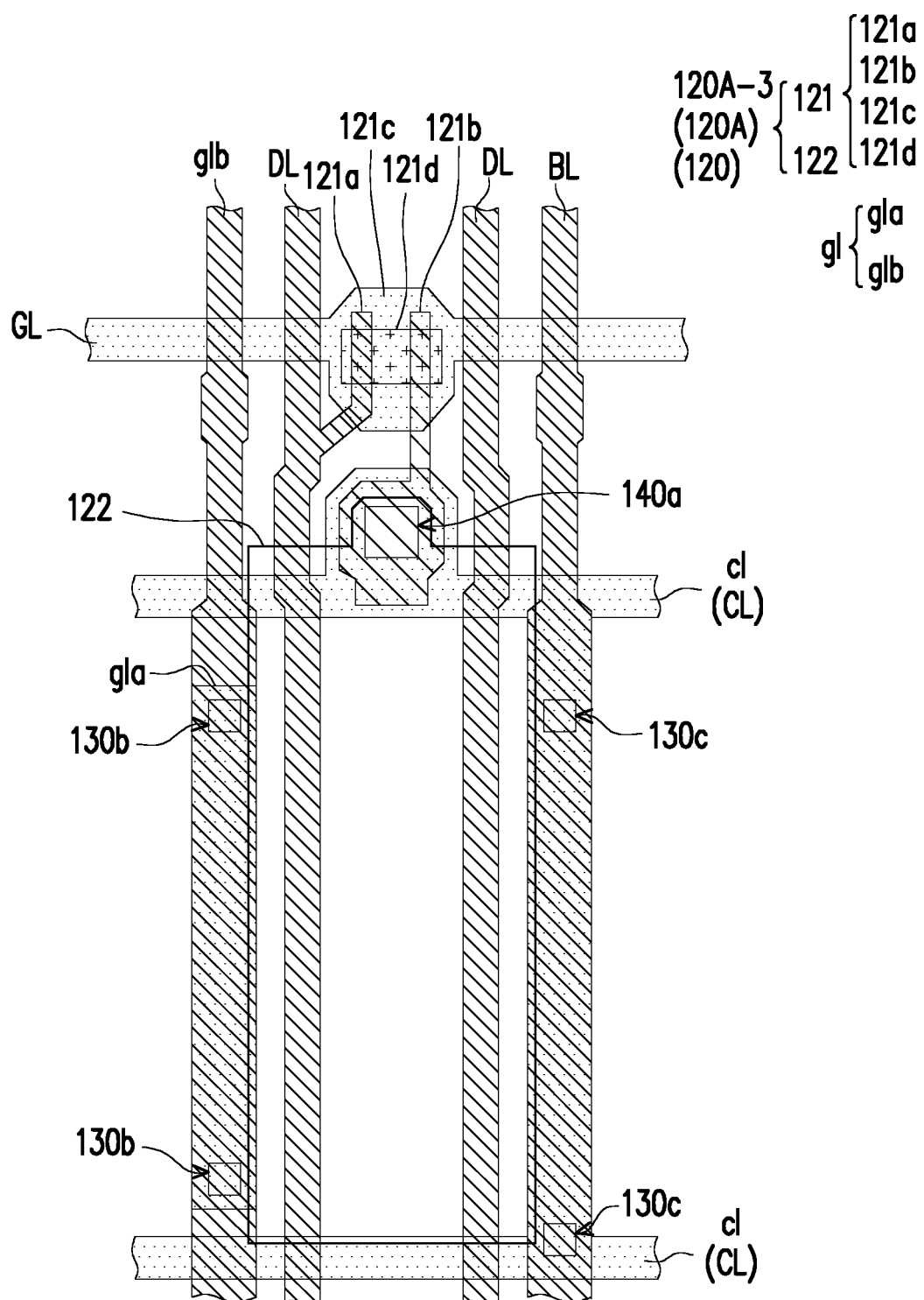
FIG. 6 is a schematic enlarged view of a pixel 120A-3 of the pixel array substrate 100 according to an embodiment of the disclosure.

FIG. 6 is a schematic enlarged view of a pixel 120A-3 of the pixel array substrate 100 according to an embodiment of the disclosure.

Figure 7:
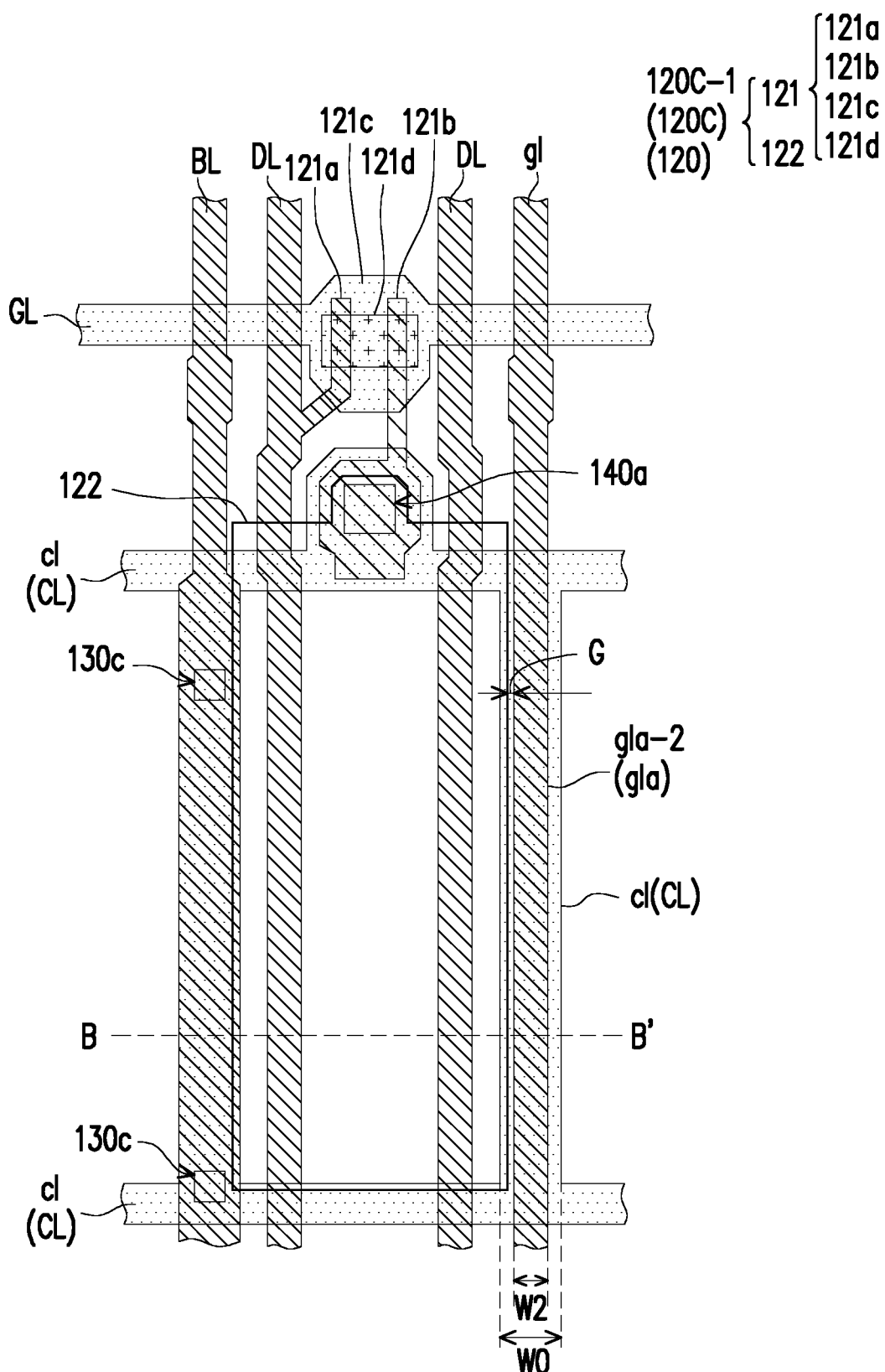
FIG. 7 is a schematic enlarged view of a pixel 120C-1 of the pixel array substrate 100 according to an embodiment of the disclosure.

FIG. 7 is a schematic enlarged view of a pixel 120C-1 of the pixel array substrate 100 according to an embodiment of the disclosure.

Figure 8:
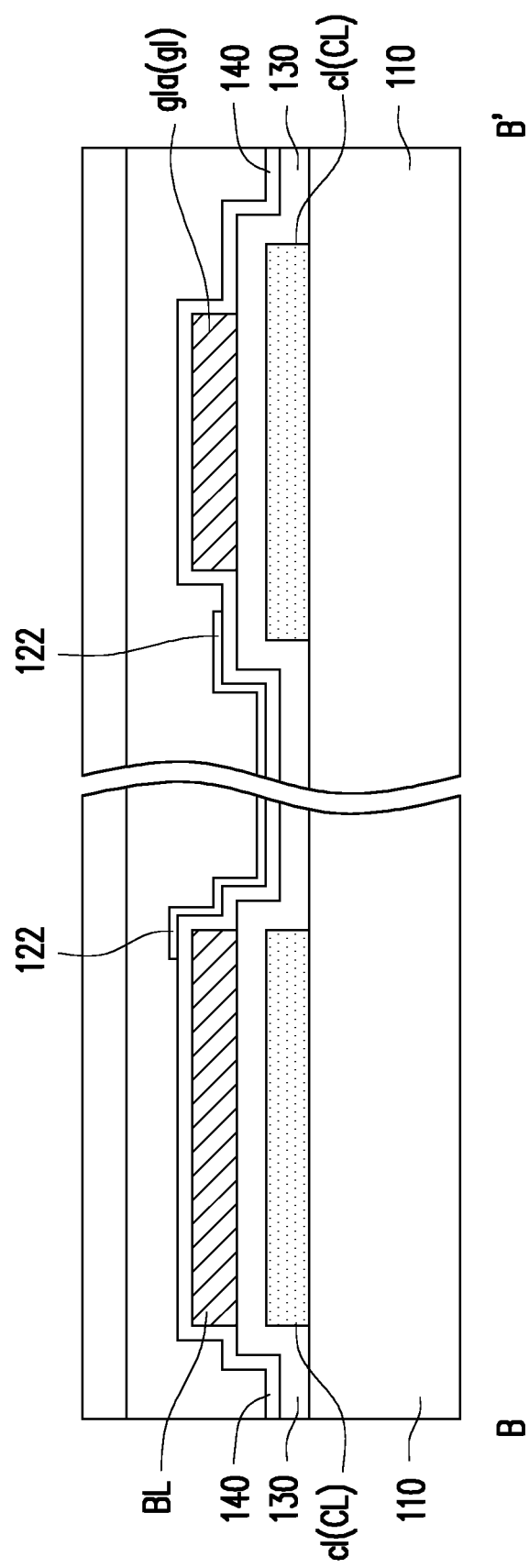
FIG. 8 is a schematic cross-sectional view of the pixel array substrate 100 according to an embodiment of the disclosure.

FIG. 8 is a schematic cross-sectional view of the pixel array substrate 100 according to an embodiment of the disclosure and corresponds to a sectional line B-B' shown in FIG. 7.

Figure 9:
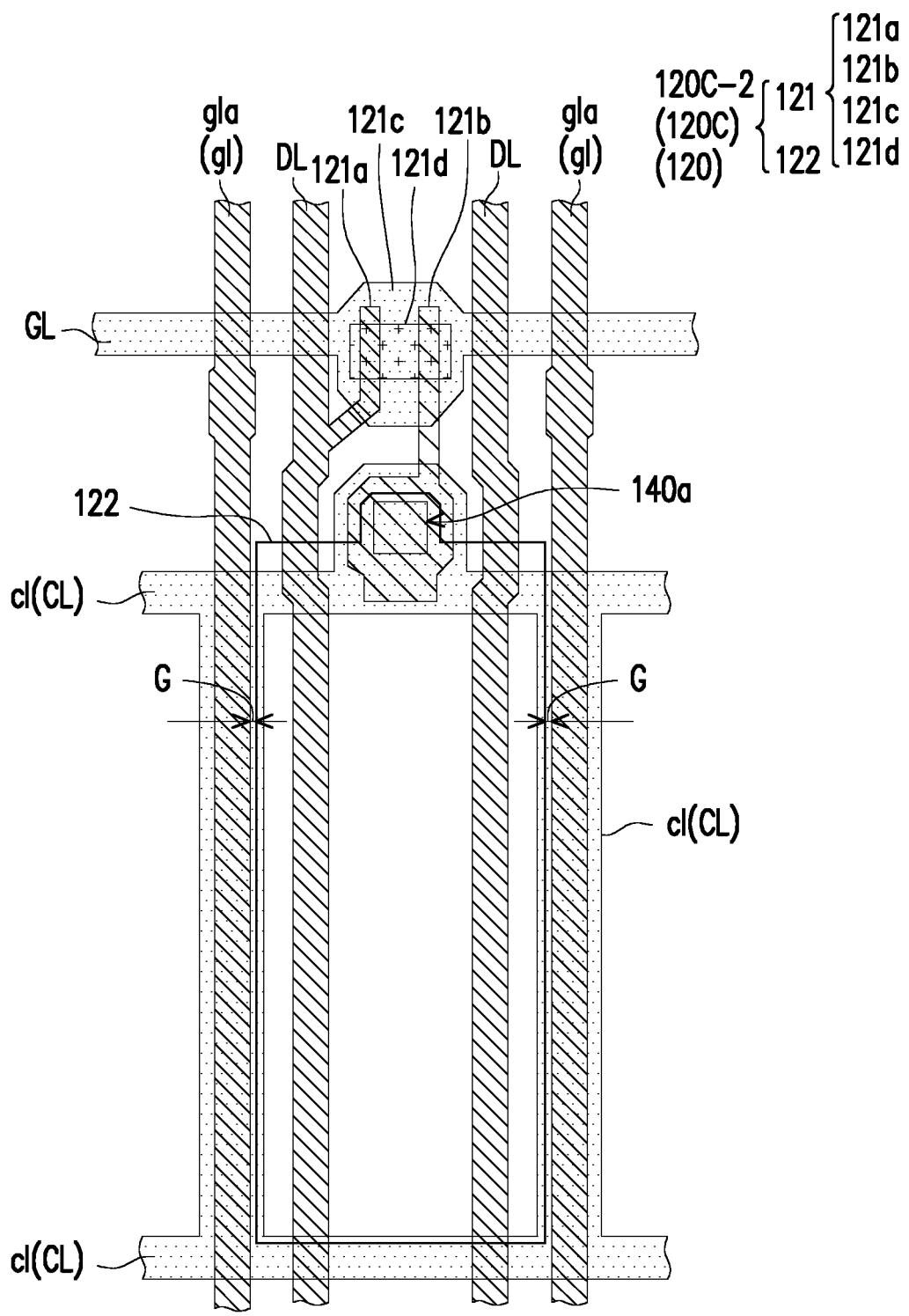
FIG. 9 is a schematic enlarged view of a pixel 120C-2 of the pixel array substrate 100 according to an embodiment of the disclosure.

FIG. 9 is a schematic enlarged view of a pixel 120C-2 of the pixel array substrate 100 according to an embodiment of the disclosure.

Figure 10:
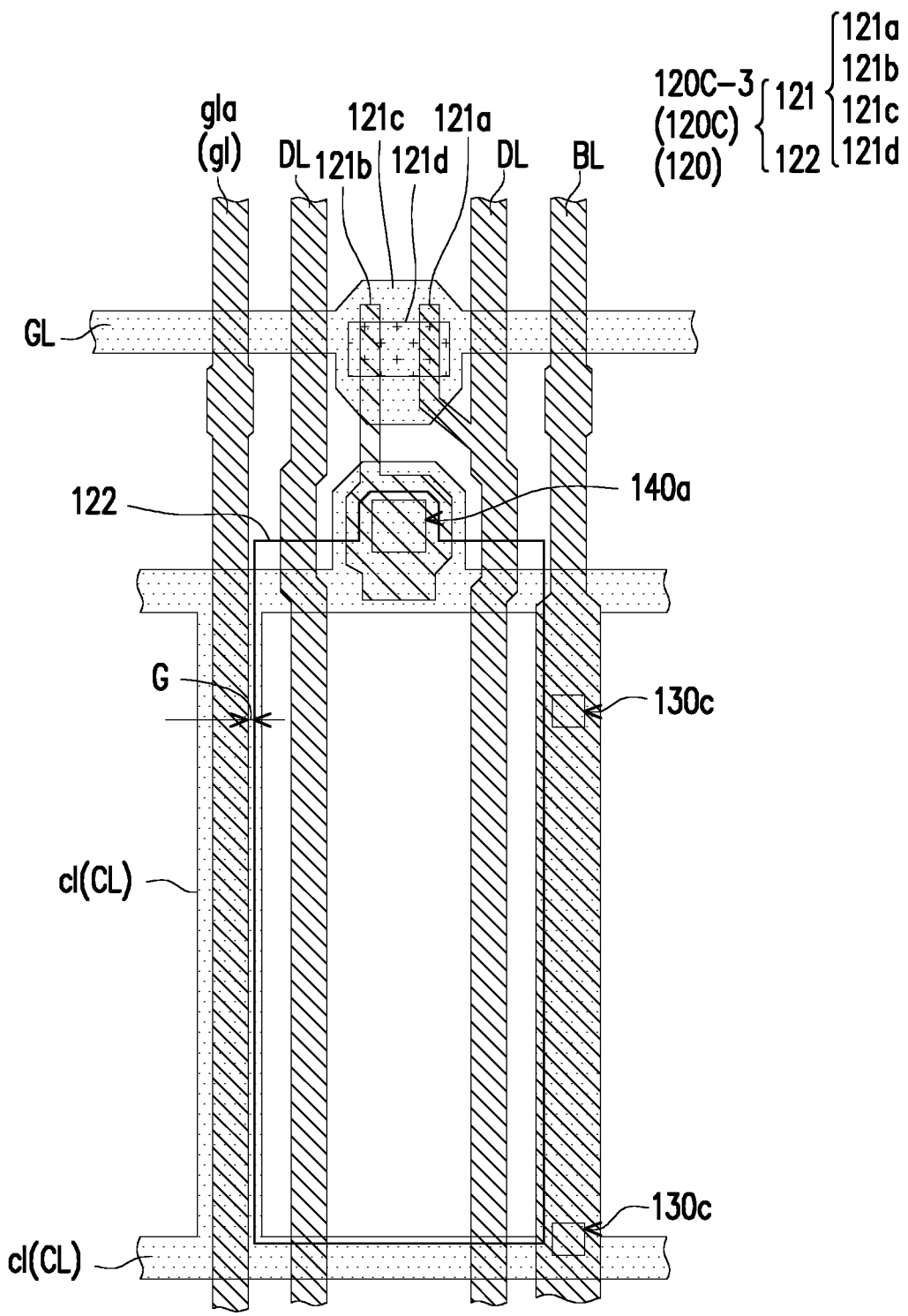
FIG. 10 is a schematic enlarged view of a pixel 120C-3 of the pixel array substrate 100 according to an embodiment of the disclosure.

FIG. 10 is a schematic enlarged view of a pixel 120C-3 of the pixel array substrate 100 according to an embodiment of the disclosure.

Figure 11:
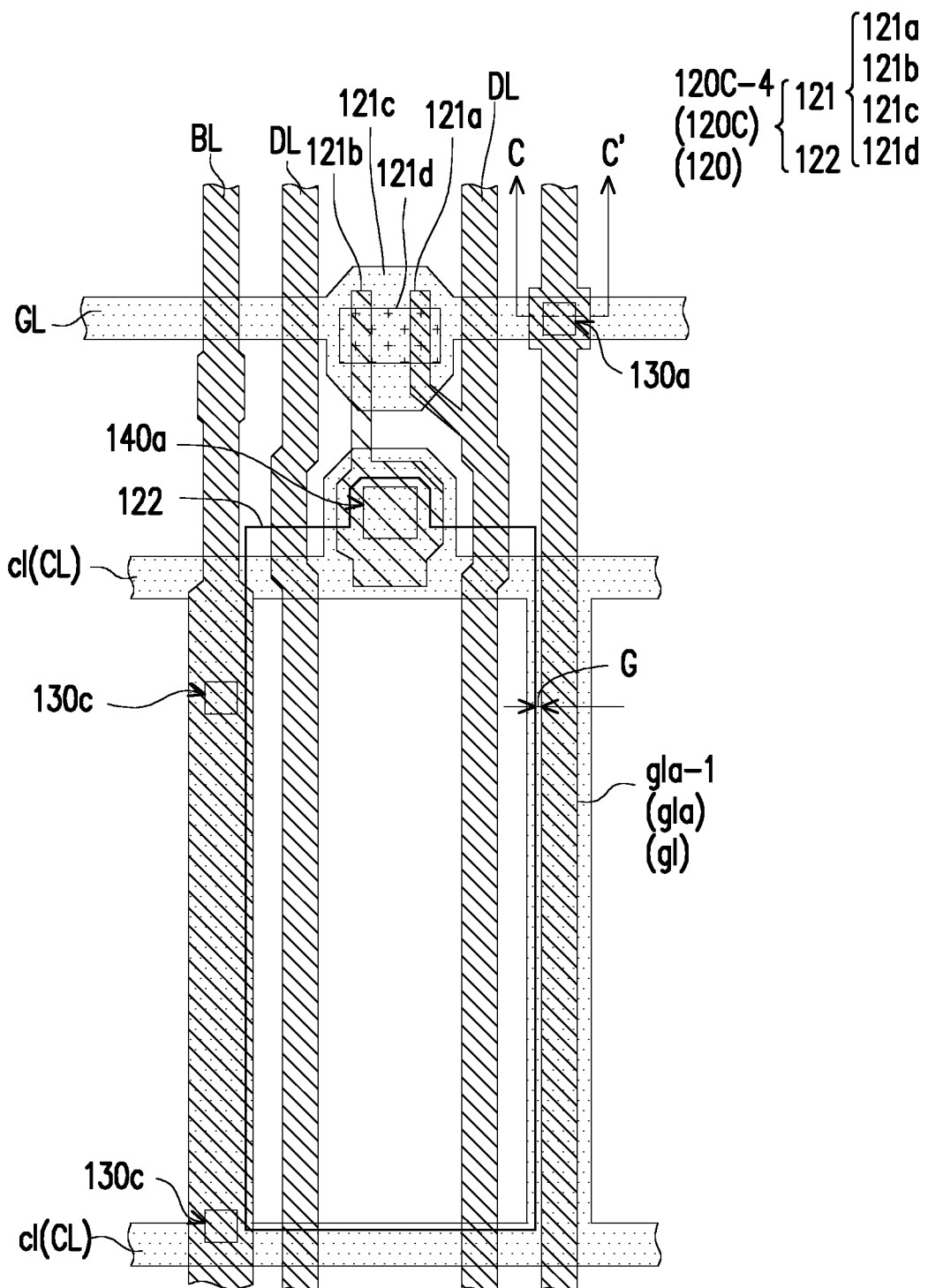
FIG. 11 is a schematic enlarged view of a pixel 120C-4 of the pixel array substrate 100 according to an embodiment of the disclosure.

FIG. 11 is a schematic enlarged view of a pixel 120C-4 of the pixel array substrate 100 according to an embodiment of the disclosure.

Figure 12:
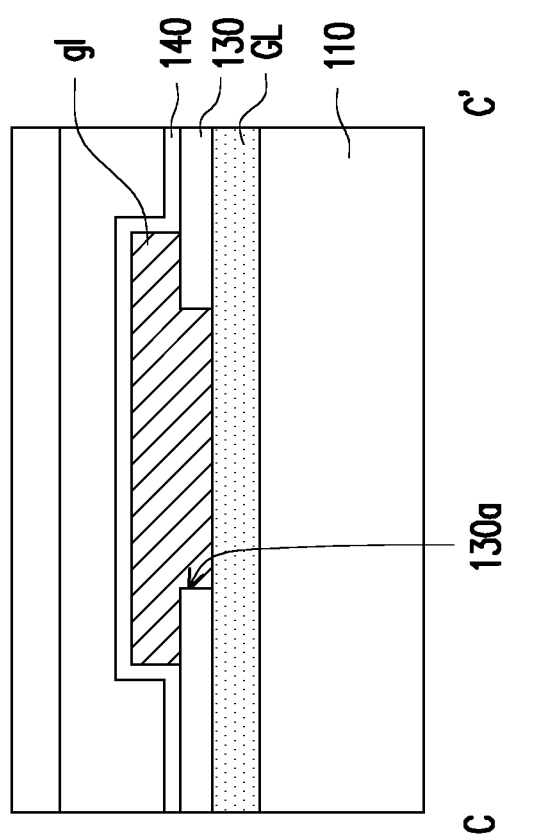
FIG. 12 is a schematic cross-sectional view of the pixel array substrate 100 according to an embodiment of the disclosure.

FIG. 12 is a schematic cross-sectional view of the pixel array substrate 100 according to an embodiment of the disclosure and corresponds to a sectional line C-C' shown in FIG. 11.

Figure 13:
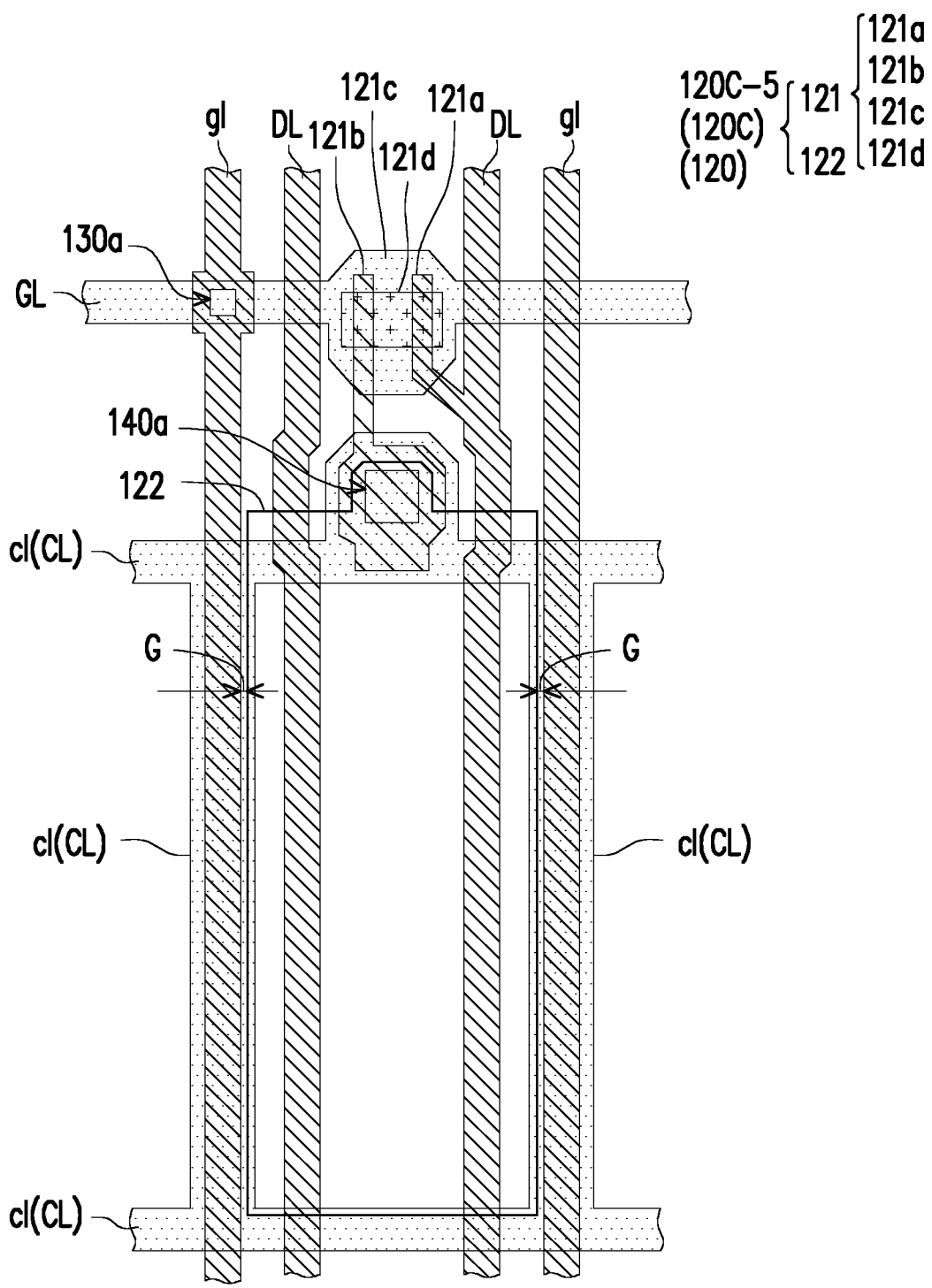
FIG. 13 is a schematic enlarged view of a pixel 120C-5 of the pixel array substrate 100 according to an embodiment of the disclosure.

FIG. 13 is a schematic enlarged view of a pixel 120C-5 of the pixel array substrate 100 according to an embodiment of the disclosure.

Figure 14:
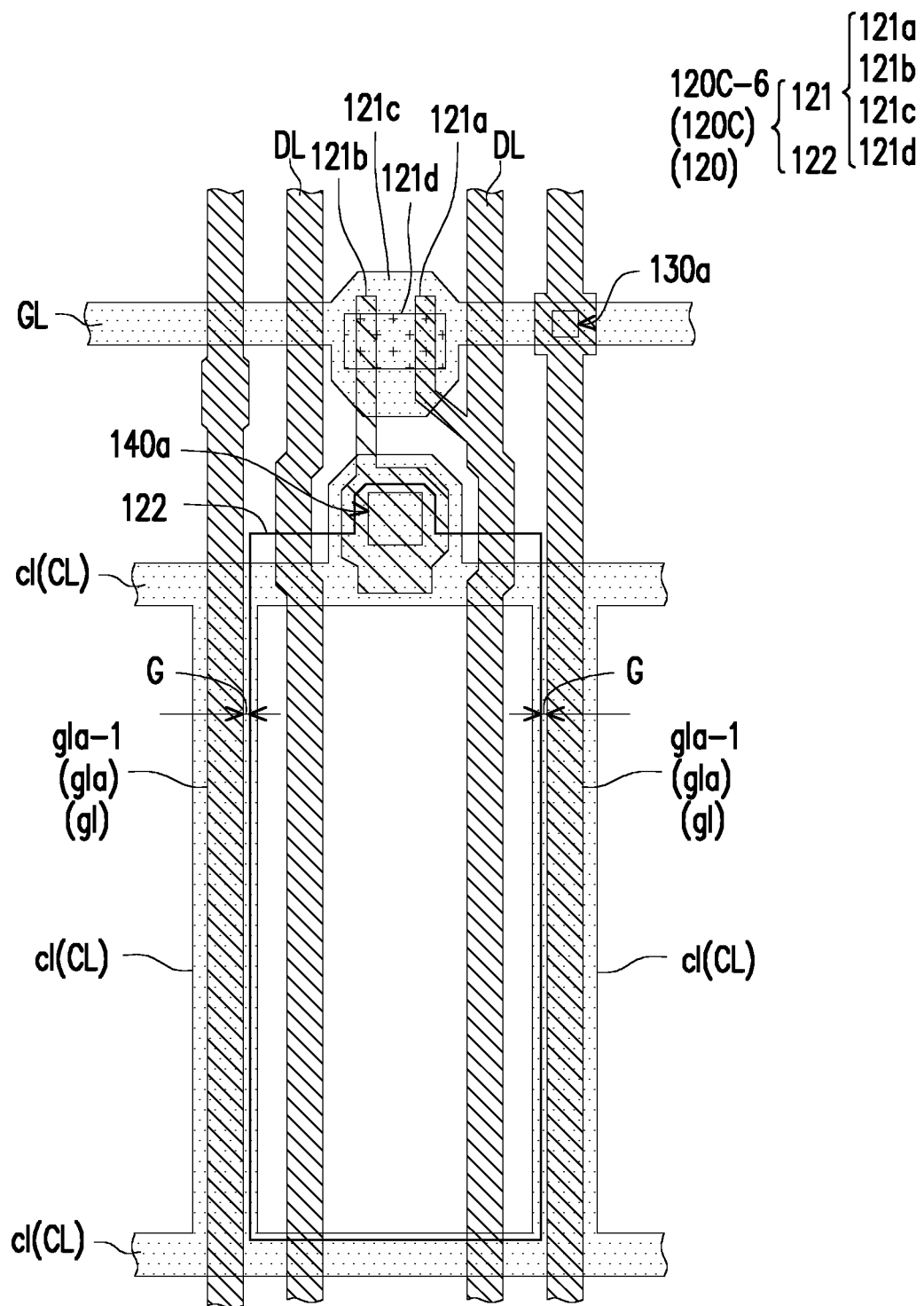
FIG. 14 is a schematic enlarged view of a pixel 120C-6 of the pixel array substrate 100 according to an embodiment of the disclosure.

FIG. 14 is a schematic enlarged view of a pixel 120C-6 of the pixel array substrate 100 according to an embodiment of the disclosure.

Figure 15:
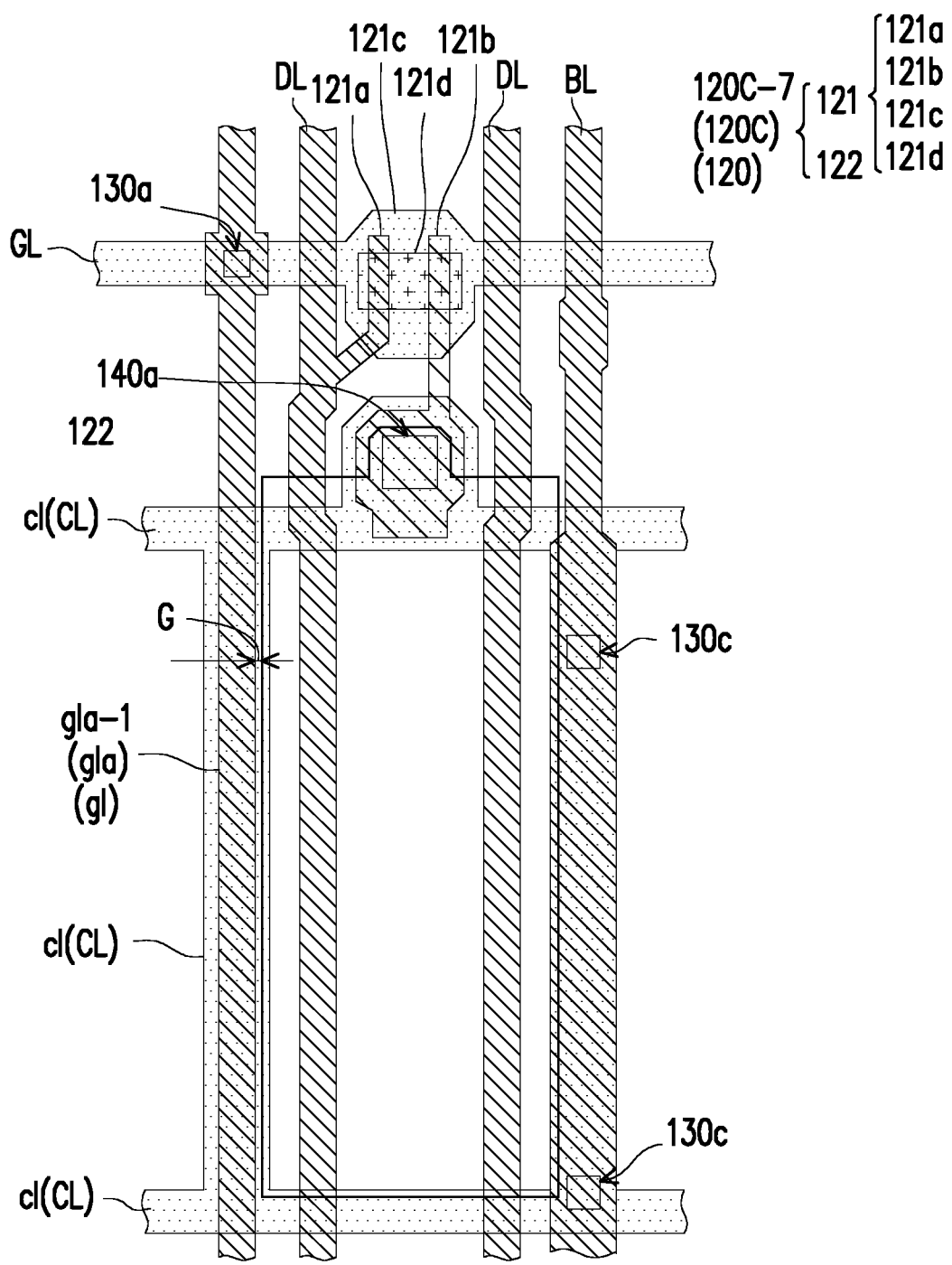
FIG. 15 is a schematic enlarged view of a pixel 120C-7 of the pixel array substrate 100 according to an embodiment of the disclosure.

FIG. 15 is a schematic enlarged view of a pixel 120C-7 of the pixel array substrate 100 according to an embodiment of the disclosure.

The structure of the pixel array substrate 100 of this embodiment is described below with reference to FIG. 1-FIG. 15.

As shown in FIG. 1 and FIG. 2, the display device 10 includes a pixel array substrate 100, an opposite substrate (not shown) opposite to the pixel array substrate 100, a display medium (not shown) disposed between the pixel array substrate 100 and the opposite substrate, and a driver device 200 for driving the pixel array substrate 100. For instance, in this embodiment, the driver device 200 may include a chip, and the chip may be bonded to the pixel array substrate 100 through a chip on film (COF) process. However, the disclosure is not limited thereto. According to other embodiments, the chip may also be bonded to the pixel array substrate 100 through a chip on glass (COG) process, tape automated bonding (TAB), or another method.

The pixel array substrate 100 includes a substrate 110. The substrate 110 is mainly configured to hold a plurality of components of the pixel array substrate 100. For instance, in this embodiment, a material of the pixel array substrate 110 may be glass. However, the disclosure is not limited thereto. According to other embodiments, the material of the substrate 110 may also be quartz, organic polymer, an opaque/reflective material (such as wafer, ceramic, etc.), or any other appropriate material.

The pixel array substrate 100 includes a plurality of data lines DL and a plurality of gate lines GL. The data lines DL and the gate lines GL are disposed on the substrate 110. The data lines DL are arranged in a first direction x, and the gate lines GL are arranged in a second direction y, wherein the first direction x and the second direction y are interlaced with each other. For instance, in this embodiment, the first direction x and the second direction y may be perpendicular to each other, which should however not be construed as a limitation in the disclosure.

In addition, the data lines DL and the gate lines GL belong to different film layers. For instance, in this embodiment, the gate lines GL may selectively belong to a first metal layer, and the data lines DL may selectively belong to a second metal layer, which should however not be construed as a limitation in the disclosure.

In consideration of conductivity, in this embodiment, the data lines DL and the gate lines GL are made of a metal material. However, the disclosure is not limited thereto. According to other embodiments, the data lines DL and the gate lines GL may also be made of other conductive materials, such as alloy, metal nitrides, metal oxides, metal oxynitrides, or a stacked layer of metal and other conductive materials.

With reference to FIG. 2, FIG. 3, and FIG. 4, the pixel array substrate 100 includes a plurality of pixels 120. The pixels 120 are disposed on the substrate 110. Each of the pixels 120 includes an active device 121 and a pixel electrode 122, the active device 121 is electrically connected to a corresponding data line DL and a corresponding gate line GL, and the pixel electrode 122 is electrically connected to the active device 121.

For instance, in this embodiment, the active device 121 includes a thin film transistor having a source 121a, a drain 121b, a gate 121c, and a semiconductor pattern 121d. The insulation layer 130 is sandwiched between the gate electrode 121c and the semiconductor pattern 121d, the source 121a and the drain 121b are respectively electrically connected to two different regions of the semiconductor pattern 121d, the source 121a is electrically connected to a corresponding data line DL, the gate 121c is electrically connected to a corresponding gate line GL, and the drain 121b is electrically connected to the pixel electrode 122. In this embodiment, each of the pixels 120 further includes a common electrode cl, and the common electrode cl and the pixel electrode 122 are partially overlapped to form a storage capacitor.

For instance, in this embodiment, the gate electrode 121c and the common electrode cl may selectively belong to the first metal layer, and the source electrode 121a and the drain electrode 121b may selectively belong to the second metal layer. The pixel array substrate 100 may further include an insulation layer 140 disposed on the second metal layer. The pixel electrode 122 may be disposed on the insulation layer 140 and electrically connected to the drain electrode 121b of the thin film transistor through a through hole 140a of the insulation layer 140; however, the disclosure is not limited thereto.

In this embodiment, the pixel electrode 122 may belong to a transparent conductive layer, which includes metal oxides, such as indium tin oxide, indium zinc oxide, aluminum tin oxide, aluminum zinc oxide, indium germanium zinc oxide, other suitable oxides, or a stacked layer of at least two of the above, which should however not be construed as a limitation in the disclosure.

With reference to FIG. 2 and FIG. 3, in this embodiment, the pixels 120 may be arranged in a plurality of pixel rows, and the pixels 120 in each pixel row are arranged in the first direction x; the common electrodes cl of the pixels 120 in the same pixel row may be directly connected to form a common electrode pattern CL; the common electrode patterns CL in the pixel rows are arranged in the second direction y; the pixel array substrate 100 further includes a plurality of bridge devices BL arranged in the first direction x; the common electrode patterns CL in the pixel rows may be electrically connected to each other through the bridge devices BL.

In other words, as shown in the top view of the pixel array substrate 100, the bridge devices BL and the common electrode patterns CL having the same reference potential may be interlaced into a mesh-like conductive pattern. However, the disclosure is not limited thereto. According to other embodiments, the common electrodes cl of the pixels 120 may also be electrically connected to each other by the bridge devices arranged in another manner.

For instance, in this embodiment, the common electrode patterns CL may selectively belong to the first metal layer, the bridge devices BL may selectively belong to the second metal layer, and the bridge devices BL may be electrically connected to the common electrodes CL through the through holes 130c of the insulation layer 130. The pattern CL, However, the disclosure is not limited thereto.

With reference to FIG. 1, FIG. 2, and FIG. 3, the pixel array substrate 100 also includes a plurality of transfer lines gl. The transfer lines gl are disposed on the substrate 110 and arranged in the first direction x. The transfer lines gl arranged in the first direction x are electrically connected to the gate lines GL arranged in the second direction y, respectively.

With reference to FIG. 2, FIG. 3, and FIG. 4, for instance, in this embodiment, the gate lines GL may selectively belong to the first metal layer, and main portions gla of the transfer lines gl may selectively belong to the second metal layer. The insulation layer 130 is disposed between the first metal layer and the second metal layer, and the insulation layer 130 has a plurality of first through-holes 130a. The main portions gla of the transfer lines gl may be electrically connected to the gate lines GL through the first through-holes 130a of the insulation layer 130, respectively, which should however not be construed as a limitation in the disclosure.

With reference to FIG. 1 and FIG. 2, in this embodiment, a source driving circuit connected to the data lines DL is disposed on the first side (e.g., an upper side) of the substrate 110, the gate lines GL are electrically connected to a gate driving circuit provided on the first side (e.g., the upper side) of the substrate 110 through the transfer lines gl. That is, in this embodiment, the source driving circuit and the gate driving circuit are disposed on the same side of the substrate 110. In addition, in this embodiment, the source driving circuit and the gate driving circuit may be selectively integrated into the same driver device 200 (e.g., a chip), which should however not be construed as a limitation in the disclosure.

With reference to FIG. 2, FIG. 3 and FIG. 4, the pixels 120 include a plurality of first pixels 120A. For clear illustration, the first pixels 120A in FIG. 2 are illustrated in form of a plurality of rectangular patterns with spots. In the top view of the pixel array substrate 100, the pixel electrode 122 of each of the first pixels 120A is partially overlapped with at least one of the transfer lines gl. Since the pixel electrode 122 of each first pixel 120A is partially overlapped with at least one transfer line gl, an area occupied by the pixel electrode 122 of the first pixel 120A is large, which is conducive to the improvement of an aperture ratio of the pixel array substrate 100.

With reference to FIG. 2, FIG. 3, FIG. 5, and FIG. 6, in this embodiment, the first pixels 120A may include various first pixels 120A-1, 120A-2, and 120A-3. As shown in FIG. 2, the first pixel 120A-1, the first pixel 120A-2, and the first pixel 120A-3 may be arranged in the first direction x.

With reference to FIG. 2, FIG. 3, and FIG. 4, a first edge (e.g., a right edge) of the pixel electrode 122 of the first pixel 120A-1 is located on one of the transfer lines gl, and a second edge (e.g., a left edge) of the pixel electrode 122 of the first pixel 120A-1 is disposed on the common electrode cl and the bridge device BL. In this embodiment, the bridge devices BL shield gaps between two adjacent pixel electrodes 122. The bridge devices BL may also be referred to as shielding metal, which should however not be construed as a limitation in the disclosure.

With reference to FIG. 2 and FIG. 5, the first edge (e.g., the right edge) and the second edge (e.g., the left edge) of the pixel electrode 122 of the first pixel 120A-2 may be located on two of the transfer lines gl, respectively.

With reference to FIG. 2 and FIG. 6, the first edge (e.g., the right edge) of the pixel electrode 122 of the first pixel 120A-3 is located on the common electrode cl and the bridge device BL, and the second edge (e.g., the left edge) of the pixel electrode 122 of the first pixel 120A-3 may be located on one of the transfer lines gl.

With reference to FIG. 2, in this embodiment, the pixels 120 of the pixel array substrate 100 further include a plurality of second pixels 120C. For clear illustration, the second pixels 120C in FIG. 2 are depicted by a plurality of blank rectangular patterns.

With reference to FIG. 2 and FIG. 7, in the top view of the pixel array substrate 100, the pixel electrodes 122 of the second pixels 120C and the common electrodes cl of the second pixels 120C are partially overlapped, and the common electrodes cl of the second pixels 120C overlap the transfer lines gl. Gaps G exists between the pixel electrodes 122 of the second pixels 120C and the transfer lines gl. That is, the pixel electrodes 122 of the second pixels 120C and the common electrodes cl of the second pixels 120C are partially overlapped, but the pixel electrodes 122 of the second pixels 120C and the transfer lines gl do not overlap.

Since the pixel electrodes 122 of the second pixels 120C and the transfer lines gl do not overlap, the parasitic capacitance between the pixel electrodes 122 of the second pixels 120C and the transfer lines gl is small, which is conducive to the reduction of a feedthrough voltage caused by the parasitic capacitance, thereby improving the performance of the display device 10.

With reference to FIG. 2, FIG. 3, and FIG. 7, in this embodiment, the main portion gla of the same transfer line gl has a first portion gla-1 and a second portion gla-2 connected to each other; in the top view of the pixel array substrate 100, the first portion gla-1 of the transfer line gl and the pixel electrode 122 of the first pixel 120A are partially overlapped, and a gap exists between the second portion gla-2 of the transfer line gl and the pixel electrode 122 of the second pixel 120C. In particular, a line width W1 of the first portion gla-1 of the transfer line gl is larger than a line width W2 of the second portion gla-2 of the transfer line gl. That is, a thickness of the transfer line gl next to the pixel electrode 122 of the second pixel 120C is reduced, so that the transfer line gl is not overlapped with the pixel electrode 122 of the second pixel 120C. With reference to FIG. 7, in addition, according to this embodiment, the line width W2 of the second portion gla-2 of the main portion gla of the transfer line gl is smaller than a line width W0 of the common electrode cl of the second pixel 120C.

With reference to FIG. 2, FIG. 7, FIG. 9, FIG. 10, FIG. 11, FIG. 13, FIG. 14, and FIG. 15, in this embodiment, the second pixels 120C include various second pixels 120C-1, 120C-2, 120C-3, 120C-4, 120C-5, 120C-6, and 120C-7.

With reference to FIG. 2, the second pixels 120C-1, 120C-2, and 120C-3 are sequentially arranged in the first direction x.

With reference to FIG. 2, FIG. 7, and FIG. 8, the transfer line gl is disposed next to the first edge (e.g., the right edge) of the pixel electrode 122 of the second pixel 120C-1, and the first edge of the pixel electrode 122 of the second pixel 120C-1 is overlapped with the common electrode cl but is not overlapped with the transfer line gl. The transfer line gl is not electrically connected to the gate 121c of the active device 121 of the second pixel 120C-1. The second edge (e.g., the left edge) of the pixel electrode 122 of the second pixel 120C-1 is disposed on the common electrode cl and the bridge device BL.

With reference to FIG. 2 and FIG. 9, a plurality of transfer lines gl are disposed next to the first edge and the second edge (e.g., the right edge and the left edge) of the pixel electrode 122 of the second pixel 120C-2, the first edge and the second edge of the pixel electrode 122 of the second pixel 120C-2 is overlapped with the common electrode cl but is not overlapped with the transfer lines gl, and the transfer lines gl are not electrically connected to the gate 121c of the active device 121 of the second pixel 120C-2.

With reference to FIG. 2 and FIG. 10, the first edge of the pixel electrode 122 of the second pixel 120C-3 is disposed on the common electrode cl and the bridge device BL; the transfer line gl is disposed next to the second edge (e.g., the left edge) of the pixel electrode 122 of the second pixel 120C-3, and the transfer line gl is not electrically connected to the gate 121c of the active device 121 of the second pixel 120C-3.

With reference to FIG. 2, FIG. 11, FIG. 12, FIG. 13, FIG. 14, and FIG. 15, the common electrode cl of each second pixel 120C-4, 120C-5, 120C-6, and 120C-7 and at least one transfer line gl are overlapped, and the at least one transfer line gl is electrically connected to the gate 121c of the active device 121 of each of the second pixels 120C-4, 120C-5, 120C-6, and 120C-7 through at least one first through hole 130a of the insulation layer 130 disposed next to the second pixels 120C-4, 120C-5, 120C-6, and 120C-7.

With reference to FIG. 2, the second pixels 120C-4 and 120C-5 are sequentially arranged in the first direction x, the second pixels 120C-6 and 120C-5 are sequentially arranged in the second direction y, and the second pixels 120C-6 and 120C-7 are arranged sequentially in the first direction x.

With reference to FIG. 2, FIG. 11, and FIG. 12, one transfer line gl is disposed next to the first edge (e.g., the right edge) of the pixel electrode 122 of the second pixel 120C-4, and the transfer line gl is electrically connected to the gate 121c of the active device 121 of the second pixel 120C-4; the second edge (e.g., the left edge) of the pixel electrode 122 of the second pixel 120C-4 is disposed on the common electrode cl and the bridge device BL.

With reference to FIG. 2 and FIG. 13, one transfer line gl is disposed next to the first edge (e.g., the right edge) of the pixel electrode 122 of the second pixel 120C-5, and the transfer line gl is not electrically connected to the gate 121c of the active device 121 of the pixel 120C-5; another transfer line gl is disposed next to the second edge (e.g., the left edge) of the pixel electrode 122 of the second pixel 120C-5 and electrically connected to the gate 121c of the active device 121 of the second pixel 120C-5.

With reference to FIG. 2 and FIG. 14, one transfer line gl is disposed next to the first edge (e.g., the right edge) of the pixel electrode 122 of the second pixel 120C-6, and the transfer line gl is electrically connected to the second pixel 120C-6 of the gate 121c of the active device 121; another transfer line gl is disposed next to the second edge (e.g., the left edge) of the pixel electrode 122 of the second pixel 120C-6 and is not electrically connected to the active device 121 of the second pixel 120C-6.

With reference to FIG. 2 and FIG. 15, the first edge (e.g., the right edge) of the pixel electrode 122 of the second pixel 120C-7 is disposed on the common electrode cl and the bridge device BL, one transfer line gl is disposed next to the second edge (e.g., the left edge) of the pixel electrode 122 of the second pixel 120C-7, and the transfer line gl is electrically connected to the gate 121c of the active device 121 of the second pixel 120C-7.

With reference to FIG. 2 and FIG. 3, in this embodiment, each of the transfer lines gl may include a main portion gla and at least one auxiliary portion glb. The main portion gla crosses over a plurality of gate lines GL, and each of the at least one auxiliary portion glb is disposed between two adjacent gate lines GL and partially overlapped with the pixel electrode 122 of one of the first pixels 120A. Two ends of each of the at least one auxiliary portion glb are electrically connected to two different regions of the main portion gla. That is, in this embodiment, each of the transfer lines gl may be formed by connecting the main portion gla belonging to different conductive layers and a plurality of auxiliary portions glb in parallel, so as to reduce the resistance value.

For instance, in this embodiment, the main portion gla of each transfer line gl may be selectively formed in the second metal layer, and the at least one auxiliary portion glb of each transfer line gl may be selectively formed in the first metal layer, the two ends of each of the at least one auxiliary portion glb may be electrically connected to the two different regions of the main portion gla through the second through hole 130b of the insulation layer 130, which should however not be construed as a limitation in the disclosure.

Figure 16:
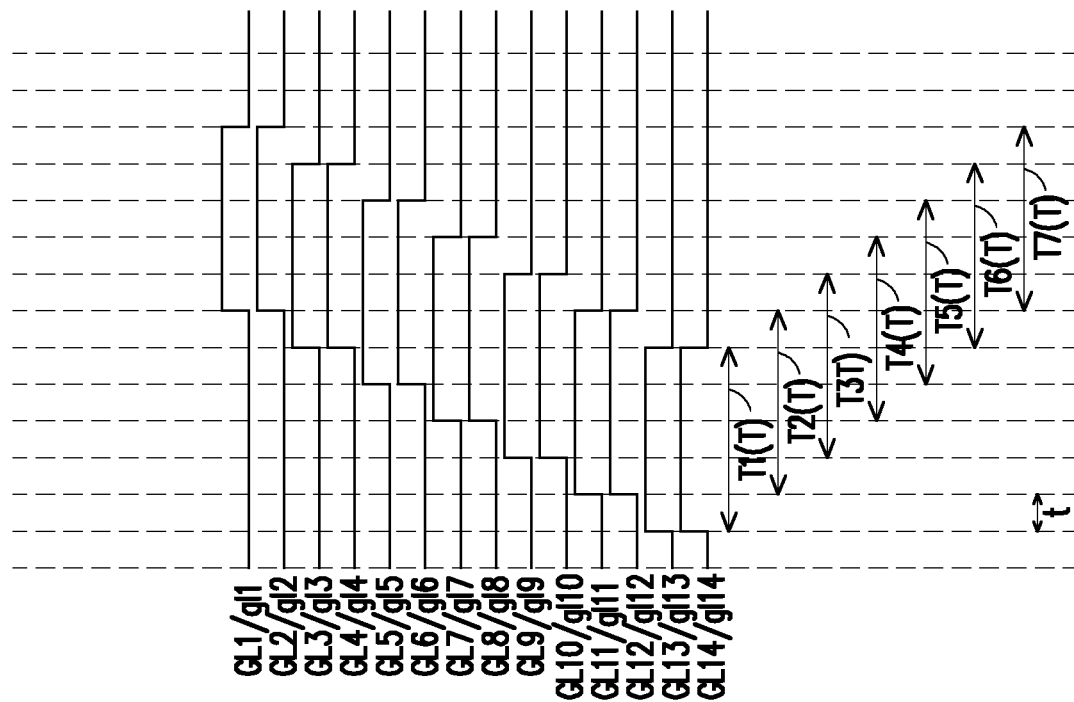
FIG. 16 shows signals of a plurality of transfer lines gl1-gl14 (or a plurality of gate lines GL1-GL14) during a reverse scan of the pixel array substrate 100 according to an embodiment of the disclosure.

FIG. 16 shows signals of a plurality of transfer lines gl1-gl14 (or a plurality of gate lines GL1-GL14) during a reverse scan of the pixel array substrate 100 according to an embodiment of the disclosure.

With reference to FIG. 2 and FIG. 16, the pixels 120 include a plurality of pixel groups GP. Each pixel group GP includes one first pixel 120A and n second pixels 120C sequentially arranged along one transfer line gl (e.g., gl14). The n second pixels 120C and one first pixel 120A are sequentially arranged in a reverse scan direction (e.g., the opposite direction of the second direction y), and the gate line GL (e.g., GL14) electrically connected to the first pixel 120A is electrically connected to the transfer line gl (e.g., gl14) through the first through hole 130a of the insulation layer 130, wherein n is a positive integer greater than or equal to 2. In other words, in the same pixel group GP, another second pixel 120C is disposed between the first pixel 120A and one second pixel 120C disposed corresponding to the first through hole 130a.

In this embodiment, the first pixel 120A of each pixel group GP is the pixel 120 closest to the second pixel 120C of the pixel group GP, and the first pixels 120A of the pixel groups GP are arranged substantially in a staircase shape.

In this embodiment, the number n of the second pixels 120C of each pixel group GP may be determined according to a driving method of the gate lines GL (or a driving method of the transfer lines gl).

Specifically, in this embodiment, the gate lines GL are divided into a plurality of gate line groups K, each of the gate line groups K includes m gate lines, and m gate lines GL of the same gate line group K are simultaneously turned on, wherein m is a positive integer greater than or equal to 1; when each of the gate line groups K is turned on, each of the m gate lines GL of the gate line group K has a gate-on pulse, and a time length of the gate pulse is T; the gate line groups K are sequentially turned on with a time delay, a time length of the time delay is t, $n \geq \{[(T-t)/t]*m\}+m$, $T=kt$, and k is a positive integer greater than or equal to 1.

For instance, in this embodiment, the gate lines GL are divided into a plurality of gate line groups K, and each of the gate line groups K includes 2 gate lines GL (i.e., m=2), two gate lines GL of the same gate line group K are turned on at the same time. When each of the gate line groups K is turned on, each of the two gate lines GL of the gate line group K has the gate-on pulse, k=5, and the time length of the gate pulse T=5t, n≥{[(5t−t)/t]*2}+2, i.e., n≥10. That is, in this embodiment, the number of the second pixel 120Cs of one pixel group GP is greater than or equal to 10, e.g., 11 or 12; however, the disclosure is not limited thereto. According to this embodiment, note that k being 5 is merely exemplary, which should however not be construed as a limitation in the disclosure. In other embodiments, k may be a positive integer other than 5 and greater than or equal to 1.

In the same pixel group GP, one gate line GL (e.g., GL14) electrically connected to the first second pixel 120C has a gate-on potential in a time interval T1, and another gate line GL (e.g., GL2) electrically connected to the first pixel 120A has the gate-on potential in a time interval T7. The time interval T1 and the time interval T7 are not overlapped in time sequence.

That is, when the gate line GL2 has the gate-on potential and the first pixel 120A of the pixel group GP is charged, the signal of the transfer line gl14 adjacent to the first pixel 120A has been switched to a gate-off potential; therefore, even though the pixel electrode 122 of the first pixel 120A and the transfer line gl14 are partially overlapped, the signal of the transfer line gl14 does not easily affect the potential of the pixel electrode 122 of the first pixel 120A.

On the other hand, in the same pixel group GP1, the gate lines GL13-GL5 that are electrically connected to other second pixels 120C (e.g., the second to ten second pixels 120C) respectively have the gate-on potential in the time intervals T1, T2, T3, T3, and T5. When the gate lines GL13-GL5 have the gate-on potential and other second pixels 120C (e.g., the second to ten second pixels 120C) are charged, the signal of the transfer line gl14 adjacent to other second pixels 120C (e.g., the second to ten second pixels 120C) is switched from the gate-on potential to the gate-off potential. However, the pixel electrodes 122 of other second pixels 120C (e.g., the second to ten second pixels 120C) do not overlap the transfer line gl14, and the parasitic capacitance between the transfer line gl14 and the pixel electrodes 122 of other second pixels 120C (e.g., the second to ten second pixels 120C) is small; therefore, the change of the signal of the transfer line gl14 does not easily affect the potentials of the pixel electrodes 122 of other second pixels 120C (e.g., the second to ten second pixels 120C).

According to this embodiment, note that the pixel electrode 122 of the first pixel 120A and the transfer line gl are overlapped, and the area occupied by the pixel electrode 122 of the first pixel 120A is large, which is conducive to the improvement of the aperture ratio of the pixel array substrate 100. In addition, in this embodiment, the transfer line gl may include the main portion gla and the at least one auxiliary portion glb which belong to two different electrical metal layers and are electrically connected to each other through the second through hole 130b, i.e., the transfer line gl may have a double-layer metal wiring design, which is conducive to the reduction of the overall resistance value of the transfer line gl, so that the pixel array substrate 100 may be easily driven. The pixel electrode 122 of the second pixel 120C and the transfer line gl are not overlapped, and the potential of the pixel electrode 122 of the second pixel 120C is not easily affected by the parasitic capacitance between the transfer line gl and the pixel electrode 122 of the second pixel 120C. In this embodiment, the positions of the first pixels 120A and the positions of the second pixels 120C appropriately arranged according to the driving method of the gate lines GL, so as to form the pixel array substrate 100 which has the high aperture ratio and may be easily driven.

Figure 17:
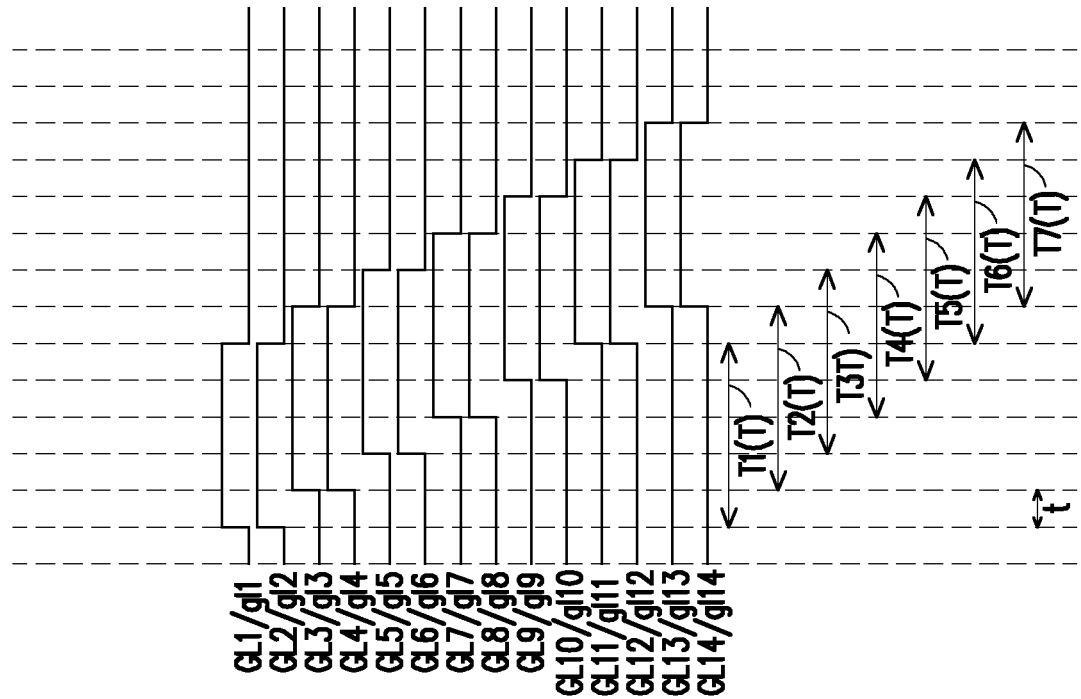
FIG. 17 shows signals of the transfer lines gl1-gl14 (or the gate lines GL1-GL14) during a forward scan of the pixel array substrate 100 according to an embodiment of the disclosure.

In the embodiment shown in FIG. 16, the pixel array substrate 100 is driven in a reverse scan manner. However, the pixel array substrate 100 is not limited to being driven in a forward scan manner or the reverse scan manner. FIG. 17 shows signals of the transfer lines gl1-gl14 (or the gate lines GL1-GL14) during a forward scan of the pixel array substrate 100 according to an embodiment of the disclosure. The pixel array substrate 100 shown in FIG. 2 may also be driven in the forward scan manner shown in FIG. 17. People having ordinary knowledge in the art are able to implement the invention according to one or more embodiments, and therefore no repetitive descriptions will be given hereinafter.

With reference to FIG. 2, FIG. 3, FIG. 7, and FIG. 11, from another perspective, each of some of the pixels 120 of the pixel substrate 100 may include an active device 121, a pixel electrode 122, and a portion of a transfer line gl, the active device 121 is electrically connected to a corresponding data line DL and a corresponding gate line GL, the pixel electrode 122 is electrically connected to the active device 121, and a portion of the transfer line gl is disposed corresponding to the pixel electrode 122.

The pixels 120 include a first pixel 120A-1, a second pixel 120C-1, and a second pixel 120C-4 (also referred to as a third pixel) arranged in the second direction y. The first pixel 120A-1, the second pixel 120C-1, and the second pixel 120C-4 include plural portions of the same transfer line gl; that is, one portion of the transfer line gl of the first pixel 120A-1, one portion of the transfer line gl of the second pixel 120C-1, and one portion of the transfer line gl of the second pixel 120C-4 are directly connected. In particular, the structure of the first pixel 120A-1, the structure of the second pixel 120C-1, and the structure of the second pixel 120C-4 are different from one another.

With reference to FIG. 2 and FIG. 3, specifically, in this embodiment, the transfer line gl of the first pixel 120A-1 and the pixel electrode 122 of the first pixel 120A-1 are partially overlapped.

With reference to FIG. 2 and FIG. 7, the pixel electrode 122 of the second pixel 120C-1 and the common electrode cl of the second pixel 120C-1 are partially overlapped, and the common electrode cl of the second pixel 120C-1 and one portion of the transfer line gl of the second pixel 120C-1 are overlapped. A gap G exists between the pixel electrode 122 of the second pixel 120C-1 and the transfer line gl of the second pixel 120C-1, and one portion of the transfer line gl of the second pixel 120C-1 crosses over one gate line GL electrically connected to the active device 121 of the second pixel 120C (i.e., one portion of the transfer line gl of the second pixel 120C-1 is electrically independent from the active device 121 of the second pixel 120C), which is different from that in the first pixel 120A-1.

With reference to FIG. 2 and FIG. 11, the pixel electrode 122 of the second pixel 120C-4 and the common electrode cl of the second pixel 120C-4 are partially overlapped, and the common electrode cl of the second pixel 120C-4 and one portion of the transfer line gl of the second pixel 120C-4 are overlapped. A gap G exists between the pixel electrode 122 of the second pixel 120C-4 and the transfer line gl of the second pixel 120C-4. One portion of the transfer line gl of the second pixel 120C-4 is a gate line GL electrically connected to the active device 121 electrically connected to the second pixel 120C-4, which is different from that in the second pixel 120C-1.

In the following embodiments, the same reference numbers are applied to denote the same or similar devices, and the description of the same technical content is omitted. The omitted parts may be referred to as those provided in the previous embodiments and will not repeated in the following embodiments.

Figure 18:
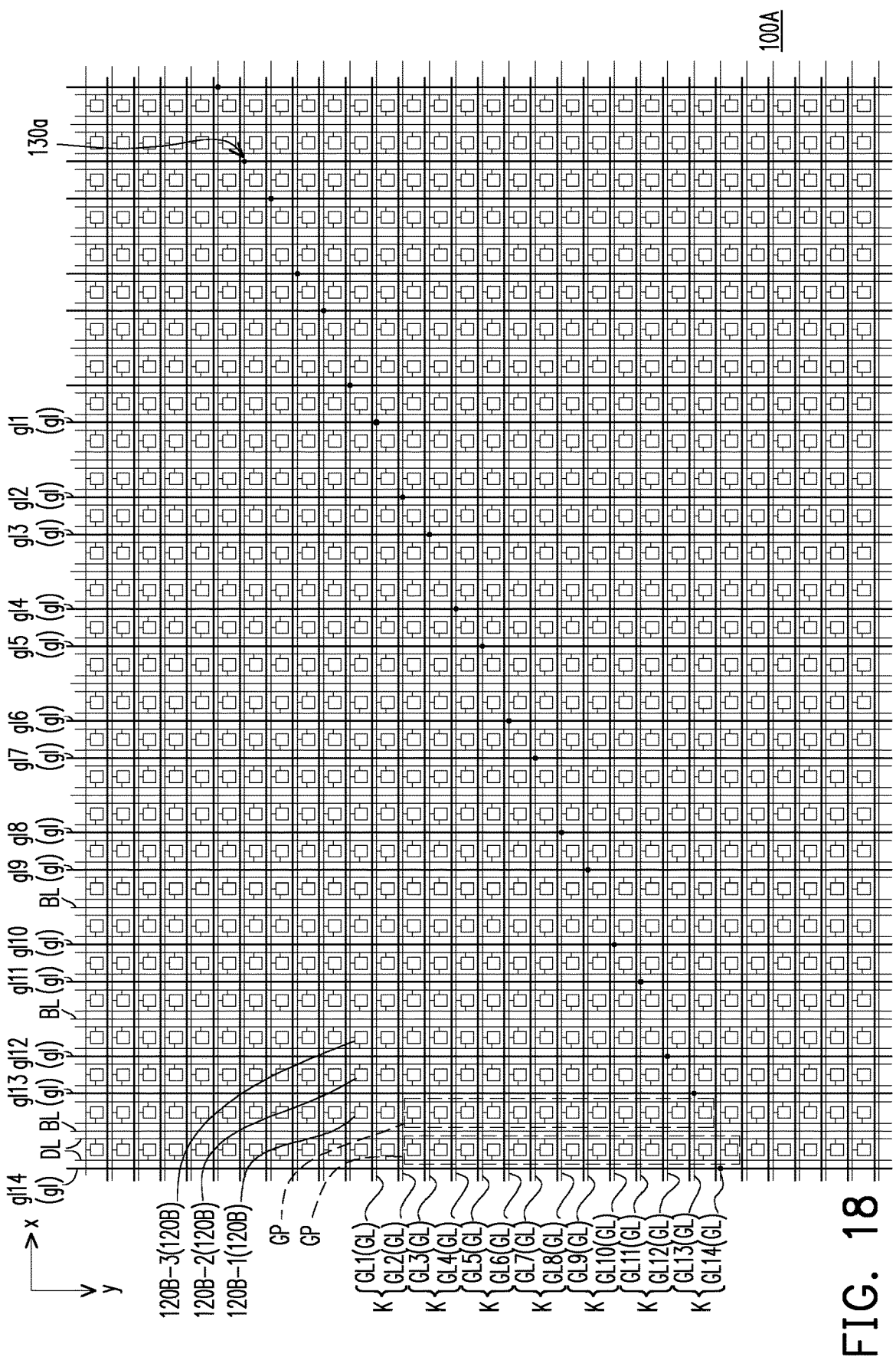
FIG. 18 is a schematic top view of a pixel array substrate 100A according to another embodiment of the disclosure.

FIG. 18 is a schematic top view of a pixel array substrate 100A according to another embodiment of the disclosure. In FIG. 18, the substrate of the pixel array substrate 100A is omitted.

Figure 19:
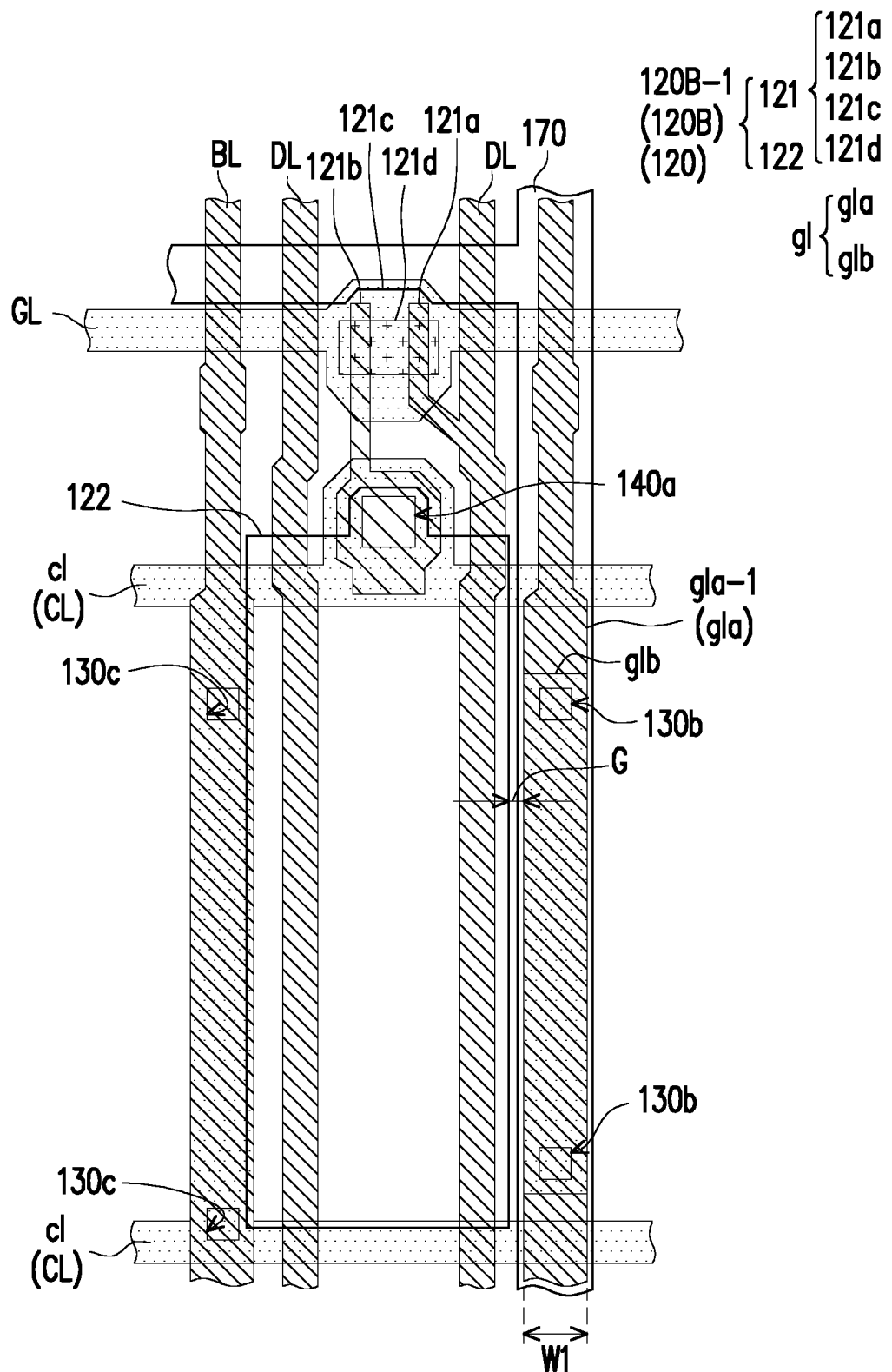
FIG. 19 is a schematic enlarged view of a pixel 120B-1 of the pixel array substrate 100A according to another embodiment of the disclosure.
Figure 20:
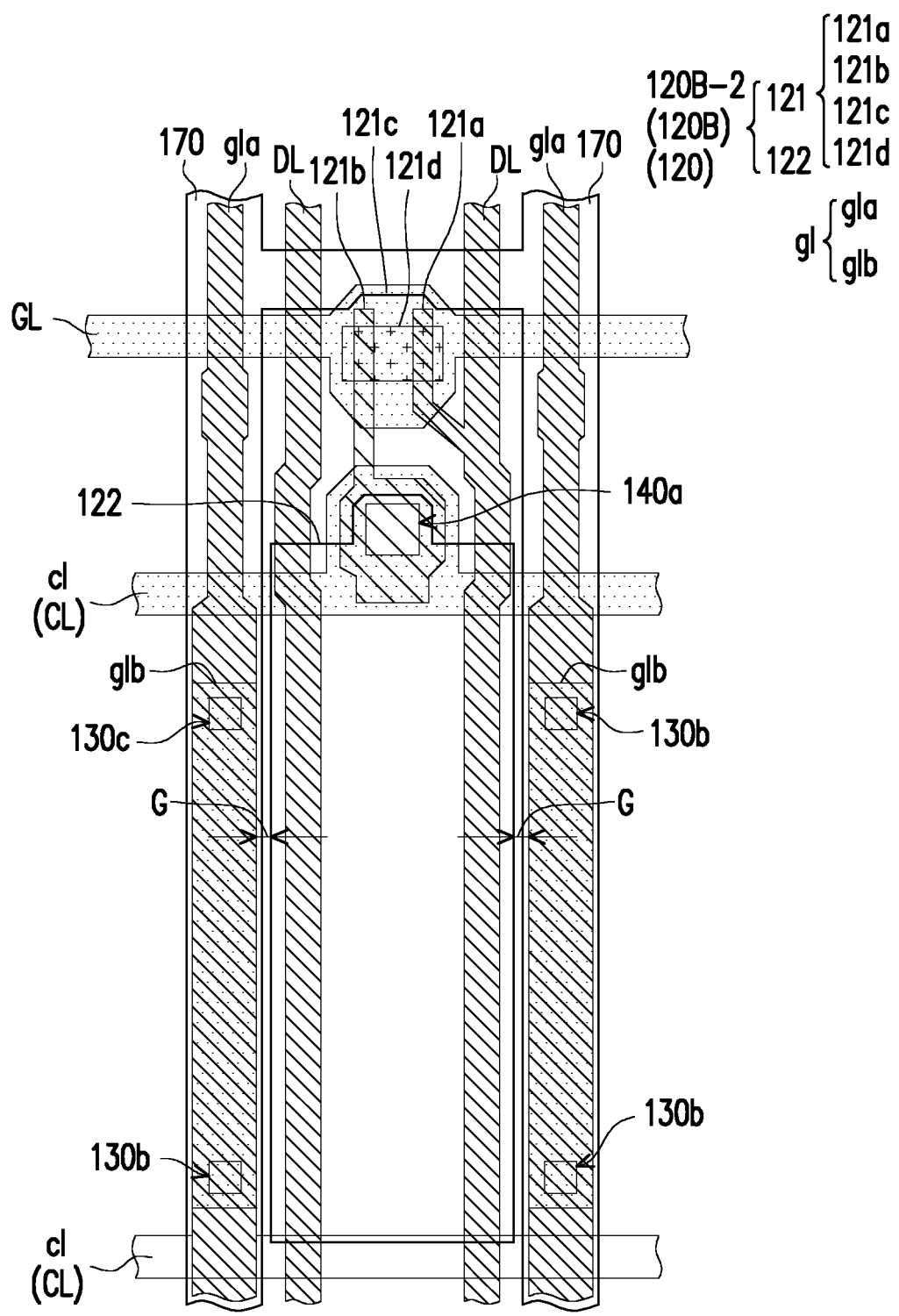
FIG. 20 is a schematic enlarged view of a pixel 120B-2 of the pixel array substrate 100A according to another embodiment of the disclosure.
Figure 21:
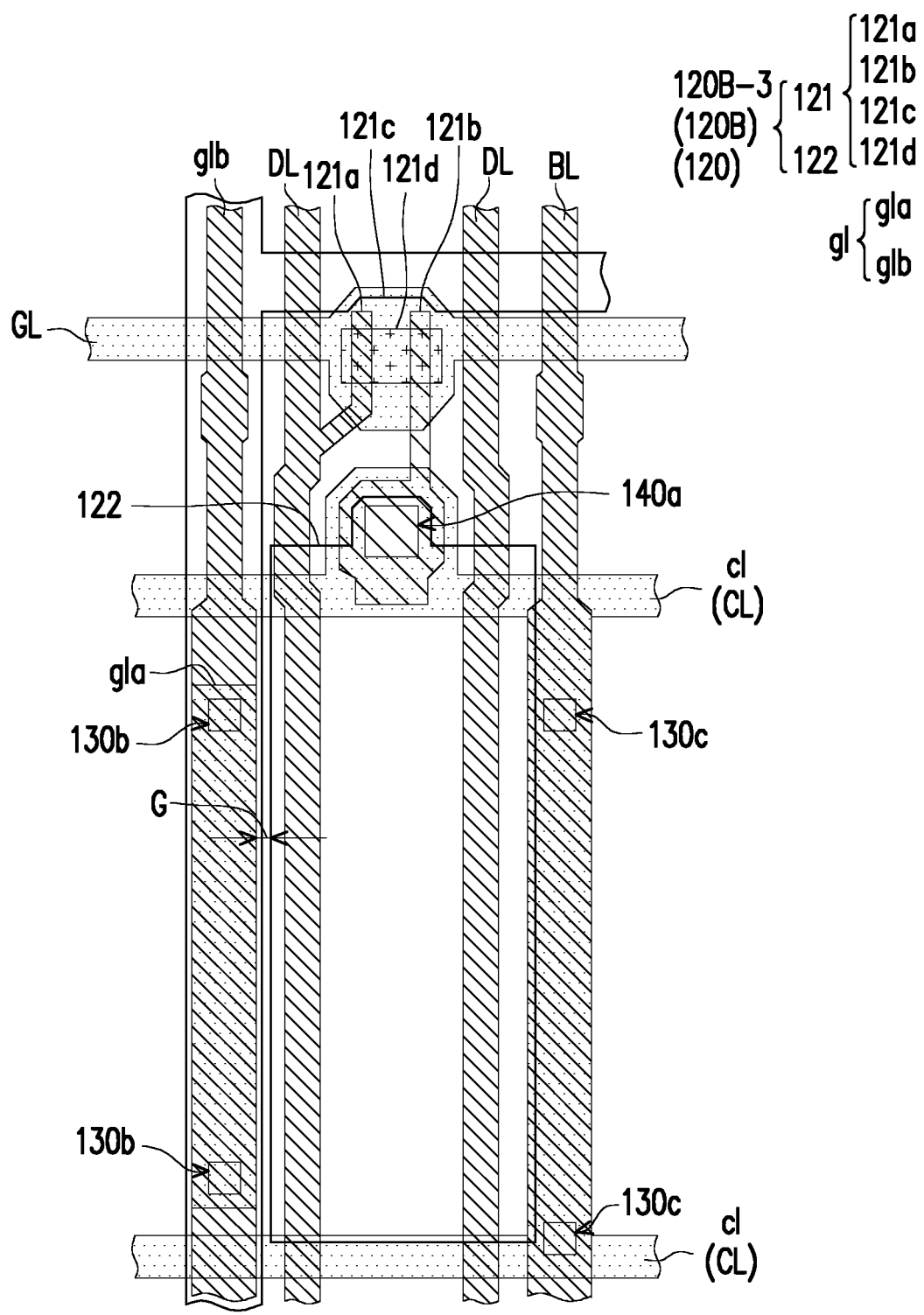
FIG. 21 is a schematic enlarged view of a pixel 120B-3 of the pixel array substrate 100A according to another embodiment of the disclosure.

Note that FIG. 18 schematically illustrates the pixel array substrate 100A and does not show the actual layout of the pixel array substrate 100A. The actual layout of various pixels 120B of the pixel array substrate 100A is depicted in FIG. 19, FIG. 20, and FIG. 21. In addition, a shielding electrode 170 shown FIG. 19, FIG. 20, and FIG. 21 is omitted in FIG. 18.

FIG. 19 is a schematic enlarged view of a pixel 120B-1 of the pixel array substrate 100A according to another embodiment of the disclosure.

FIG. 20 is a schematic enlarged view of a pixel 120B-2 of the pixel array substrate 100A according to another embodiment of the disclosure.

FIG. 21 is a schematic enlarged view of a pixel 120B-3 of the pixel array substrate 100A according to another embodiment of the disclosure.

With reference to FIG. 18, FIG. 19, FIG. 20, and FIG. 21, the pixel array substrate 100A includes a plurality of data lines DL, a plurality of gate lines GL, a plurality of pixels 120B, and a plurality of transfer lines gl. The data lines DL are arranged in a first direction x, and the gate lines GL are arranged in a second direction y, wherein the first direction x and the second direction y are interlaced with each other. Each of the pixels 120B includes an active device 121 and a pixel electrode 122. The active device 121 is electrically connected to one corresponding data line DL and one corresponding gate line GL. The pixel electrode 122 is electrically connected to the active device 121. The transfer lines gl are arranged in the first direction x and electrically connected to the gate lines GL arranged in the second direction y, respectively.

Different from the aforementioned pixel array substrate 100, the pixel array substrate 100A provided in this embodiment further includes a shielding electrode 170. In the top view of the pixel array substrate 100A, a gap G exists between the transfer line gl and the pixel electrode 122 of at least one pixel 120B, the shielding electrode 170 is separated from the pixel electrode 122 of the pixel 120B, and the shielding electrode 170 and the transfer line gl are overlapped. The shielding electrode 170 may block an electric field generated by the transfer line gl, so as to reduce the adverse effect of the transfer line gl on the potential of the pixel electrode 122. For instance, in this embodiment, the shielding electrode 170 and the pixel electrode 122 may belong to the same transparent conductive layer, which should however not be construed as a limitation in the disclosure.

In this embodiment, the pixels 120B may include various pixels 120B-1, 120B-2, and 120B-3. One pixel 120B-1, one pixel 120B-2, and one pixel 120B-3 are arranged in the first direction x.

The pixel 120B-1, the pixel 120B-2, and the pixel 120B-3 are similar to the aforementioned first pixel 120A-1, first pixel 120A-2, and first pixel 120A-3, respectively, and the difference lies in that at least one gap G exists between each of the pixel electrodes 122 of the pixels 120B-1, 120B-2, and 120B-3 and at least one adjacent transfer line gl, and the shielding electrode 170 is overlapped with the transfer lines gl of the pixel electrodes 122 adjacent to the pixels 120B-1, 120B-2, and 120B-3.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pixel array substrate, comprising:
a substrate;
a plurality of data lines, disposed on the substrate and arranged in a first direction;
a plurality of gate lines, disposed on the substrate and arranged in a second direction, wherein the first direction and the second direction are interlaced with each other;
a plurality of pixels, disposed on the substrate, each of the pixels comprising an active device and a pixel electrode, wherein the active device is electrically connected to a corresponding data line of the data lines and a corresponding gate line of the gate lines, and the pixel electrode is electrically connected to the active device through a first through hole of an insulation layer;
a plurality of transfer lines, arranged in the first direction and electrically connected to the gate lines; and
a shielding electrode, wherein the pixels comprise a plurality of first pixels; in a top view of the pixel array substrate, a gap exists between the pixel electrode of at least one of the first pixels and one of the transfer lines, the shielding electrode is separated from the pixel electrode of the at least one of the first pixels, and the shielding electrode is overlapped with the one of the transfer lines.

2. The pixel array substrate according to claim 1, wherein the each of the pixels further comprises a common electrode, and the common electrode and the pixel electrode of the each of the pixels are partially overlapped;
the pixels are arranged in a plurality of pixel rows, pixels in each of the pixel row are arranged in the first direction, common electrodes of pixels in an identical pixel row of the pixel rows are connected to form a common electrode pattern;
the pixel array substrate further comprises a plurality of bridge devices arranged in the first direction, wherein common electrode patterns in the pixel rows are electrically connected to each other through the bridge devices.

3. The pixel array substrate according to claim 2, wherein the shielding electrode is overlapped with at least one of the bridge devices.

4. The pixel array substrate according to claim 2, wherein the shielding electrode is overlapped with at least one of the bridge devices and the common electrode of one of the first pixels.

5. The pixel array substrate according to claim 2, wherein the pixel electrode of one of the first pixel is overlapped with one of the bridge devices.

6. The pixel array substrate according to claim 1, wherein the shielding electrode is overlapped with at least one of the data lines.

7. The pixel array substrate according to claim 1, wherein the one of the transfer lines comprises a main portion and an auxiliary portion, the main portion crosses over the gate lines, the auxiliary portion is disposed between two adjacent gate lines of the gate lines; two ends of the auxiliary portion are electrically connected to the main portion, respectively; the shielding electrode is overlapped with the auxiliary portion.

8. The pixel array substrate according to claim 1, wherein a width of the shielding electrode in the first direction is larger than a width of the one of the transfer lines in the first direction.

9. The pixel array substrate according to claim 1, wherein the each of the pixels further comprises a common electrode, and the common electrode and the pixel electrode of the each of the pixels are partially overlapped;
the shielding electrode and the common electrode of the at least one of the first pixels are overlapped.

10. The pixel array substrate according to claim 1, wherein the each of the pixels further comprises a common electrode, and the common electrode and the pixel electrode of the each of the pixels are partially overlapped;
the shielding electrode is overlapped with at least one of the data lines and the common electrode of the at least one of the first pixels.

11. The pixel array substrate according to claim 1, wherein the pixels comprise a plurality of second pixels; in a top view of the pixel array substrate, a portion of at least one of the pixel electrodes of the second pixels is overlapped with the one of the transfer lines, and another portion of the at least one of the pixel electrodes of the second pixels is not overlapped with the one of the transfer lines.

12. The pixel array substrate according to claim 1, wherein the pixels further comprise a plurality of third pixels, at least one of the third pixels further comprises a common electrode,
in the top view of the pixel array substrate, the pixel electrode and the common electrode of the at least one of the third pixels are partially overlapped, the common electrode of the at least one of the third pixels and the one of the transfer lines are overlapped, and a gap exists between the pixel electrode of the at least one of the third pixels and the one of the transfer lines.

13. The pixel array substrate according to claim 12, wherein the one of the transfer lines has a first portion and a second portion connected to each other,
in the top view of the pixel array substrate, the first portion of the one of the transfer lines and the at least one of the pixel electrodes of the second pixels partially overlap, the gap exists between the second portion of the one of the transfer lines and the pixel electrode of the at least one of the third pixels, and a line width of the first portion of the one of the transfer lines is greater than a line width of the second portion of the one of the transfer lines.

14. The pixel array substrate according to claim 12, wherein the one of the transfer lines has a second portion,
in the top view of the pixel array substrate, the gap exists between the second portion of the one of the transfer lines and the pixel electrode of the at least one of the third pixels, and a line width of the second portion of the one of the transfer lines is smaller than a line width of the common electrode of the at least one of the third pixels.

15. The pixel array substrate according to claim 11, wherein the pixels further comprise a plurality of third pixels, each of the third pixels comprises a common electrode,
in the top view of the pixel array substrate, the pixel electrode and the common electrode of each of the third pixels are partially overlapped, the common electrode of each of the third pixels is overlapped with a corresponding transfer line of the transfer lines, and a gap exists between the pixel electrode of each of the third pixels and the corresponding transfer line;
the pixels comprise a plurality of pixel groups, each of the pixel groups comprises n third pixels and one of the second pixels sequentially arranged along the corresponding transfer line, wherein n is a positive integer greater than or equal to 2;
the one of the second pixels of each of the pixel groups is a pixel in the each of the pixel groups closest to the third pixels of the each of the pixel groups;
the second pixels of the pixel groups are arranged in a third direction, wherein the third direction is different with the first direction and the second direction.

16. The pixel array substrate according to claim 1, wherein each of the transfer lines comprises a main portion and at least one auxiliary portion, the insulation layer is sandwiched between the main portion and the at least one auxiliary portion, the main portion crosses over the gate lines, the at least one auxiliary portion is disposed between two adjacent gate lines of the gate lines and partially overlapped with the at least one of the pixel electrodes of the second pixels, and two different regions of the main portion are electrically connected to two ends of the at least one auxiliary portion through a plurality of second through holes of the insulation layer.

17. The pixel array substrate according to claim 11, wherein the pixels further comprise a plurality of third pixels, each of the third pixels comprises a common electrode,
in the top view of the pixel array substrate, the pixel electrode and the common electrode of each of the third pixels are partially overlapped, the common electrode of each of the third pixels is overlapped with a corresponding transfer line of the transfer lines, and a gap exists between the pixel electrode of each of the third pixels and the corresponding transfer line;
the pixels comprise a plurality of pixel groups, each of the pixel groups comprises n third pixels and one of the second pixels sequentially arranged along the corresponding transfer line, wherein n is a positive integer greater than or equal to 2;
the n third pixels of each of the pixel groups comprising a first third pixel to an $n^{th}$ third pixel, wherein the first third pixel to an $n^{th}$ third pixel and the one of the second pixels of the each of the pixel groups are arranged in sequence, and the one of the second pixels of the each of the pixel groups is a pixel in the each of the pixel groups closest to the third pixels of the each of the pixel groups;
in a first time interval, one of the gate lines electrically connected to the first third pixel of one of the pixel groups to has a gate-on potential; and
in a second time interval, another one of the gate lines electrically connected to the second pixel of the one of the pixel groups to has the gate-on potential, wherein the first time interval and the second time interval are not overlapped in time sequence.

18. The pixel array substrate according to claim 11, wherein the pixels further comprise a plurality of third pixels, each of the third pixels comprises a common electrode,
in the top view of the pixel array substrate, the pixel electrode and the common electrode of each of the third pixels are partially overlapped, the common electrode of each of the third pixels is overlapped with a corresponding transfer line of the transfer lines, and a gap exists between the pixel electrode of each of the third pixels and the corresponding transfer line;

the pixels comprise a plurality of pixel groups, each of the pixel groups comprises n third pixels and one of the second pixels sequentially arranged along the corresponding transfer line, wherein n is a positive integer greater than or equal to 2;

the gate lines are categorized into a plurality of gate line groups, and each of the gate line groups comprises m gate lines, wherein m is a positive integer greater than or equal to 1;

the m gate lines of the same gate line groups are simultaneously be turned on, wherein when each of the gate line groups is turned on, each of the m gate lines of the each of the gate line groups has a gate-on pulse; and the gate line groups are sequentially turned on with a time delay, wherein a time length of the time delay is t, the time length of the gate-on pulse is T, and $n \geq \{[(T-t)/t]*m\}+m$.

19. The pixel array substrate according to claim 11, wherein the data lines are electrically connected to a source driving circuit, the gate lines are electrically connected to a gate driving circuit, and the source driving circuit and the gate driving circuit are disposed on an identical side of the substrate.

20. The pixel array substrate according to claim 11, wherein a first edge of the pixel electrode of one of the second pixels is located on one of the transfer lines.

* * * * *